(12) United States Patent
Moon et al.

(10) Patent No.: US 12,204,809 B2
(45) Date of Patent: Jan. 21, 2025

(54) METHOD AND APPARATUS FOR SWITCHING DISPLAY DISPLAYING SCREEN OF APPLICATION BETWEEN PLURALITY OF DISPLAYS

(71) Applicant: SAMSUNG ELECTRONICS CO., LTD., Suwon-si (KR)

(72) Inventors: Minjeong Moon, Suwon-si (KR); Hyundo Lee, Suwon-si (KR); Myoungwoo Nam, Suwon-si (KR); Chanpyo Park, Suwon-si (KR); Bona Lee, Suwon-si (KR); Seungyong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/337,941

(22) Filed: Jun. 20, 2023

(65) Prior Publication Data
US 2024/0069848 A1    Feb. 29, 2024

Related U.S. Application Data

(63) Continuation of application No. PCT/KR2023/006811, filed on May 19, 2023.

(30) Foreign Application Priority Data

Aug. 24, 2022  (KR) .................. 10-2022-0106376
Sep. 1, 2022   (KR) .................. 10-2022-0110840

(51) Int. Cl.
*G06F 3/14*      (2006.01)
*G06F 1/16*      (2006.01)
(Continued)

(52) U.S. Cl.
CPC ........... *G06F 3/1446* (2013.01); *G06F 1/1652* (2013.01); *G06F 1/1677* (2013.01); *G06F 3/013* (2013.01); *H04M 1/0268* (2013.01)

(58) Field of Classification Search
CPC ...... G06F 1/1641; G06F 1/1652; G06F 3/013; G06F 1/1677
See application file for complete search history.

(56) References Cited

U.S. PATENT DOCUMENTS 9,318,070 B2   4/2016  Park et al.
10,657,926 B2  5/2020  Shin et al.
(Continued)

FOREIGN PATENT DOCUMENTS

CN   110825301   2/2020
CN   114840280   8/2022
(Continued)

OTHER PUBLICATIONS

Search Report dated Aug. 22, 2023 issued in International Patent Application No. PCT/KR2023/006811.

*Primary Examiner* — Robin J Mishler
(74) *Attorney, Agent, or Firm* — Nixon & Vanderhye P.C.

(57) ABSTRACT

According to an embodiment, an electronic device includes a display module including a main display and a sub-display. The electronic device includes a memory configured to store computer-executable instructions. The electronic device includes a processor configured to execute the instructions by accessing the memory. The instructions, when executed, may cause the processor to, in response to a state of the electronic device executing an application being changed to a partially unfolded intermediate state, display a graphic object associated with switching a screen display of the application from the main display to the sub-display on a partial area of the main display. The instructions, when executed, may cause the processor to, in response to the (Continued)

graphic object being displayed in a specified position on the partial area before the state of the electronic device is changed to a folded state, display a screen of the application on the sub-display.

18 Claims, 13 Drawing Sheets

(51) Int. Cl.
    *G06F 3/01*     (2006.01)
    *H04M 1/02*     (2006.01)

(56) References Cited

U.S. PATENT DOCUMENTS

| | | |
|---|---|---|
| 11,228,671 B2 | 1/2022 | Kumar Agrawal et al. |
| 2012/0326971 A1 | 12/2012 | Zhou |
| 2014/0062976 A1 | 3/2014 | Park et al. |
| 2015/0331593 A1* | 11/2015 | Lee ........................ G06F 1/1641 |
| | | 345/667 |
| 2016/0187994 A1* | 6/2016 | La ........................... G06F 3/147 |
| | | 345/619 |
| 2018/0284844 A1 | 10/2018 | Jeune et al. |
| 2018/0342226 A1 | 11/2018 | Shin et al. |
| 2018/0365495 A1 | 12/2018 | Laycock et al. |
| 2019/0377384 A1* | 12/2019 | Kummer ............. H04M 1/0235 |
| 2020/0128116 A1* | 4/2020 | Jang ....................... G06F 1/1616 |
| 2020/0314226 A1 | 10/2020 | Kumar Agrawal et al. |
| 2021/0279025 A1 | 9/2021 | Kaede |
| 2022/0066724 A1* | 3/2022 | Moon ................... G06F 1/1681 |
| 2023/0044497 A1* | 2/2023 | Zhang ................... G06F 3/1423 |

FOREIGN PATENT DOCUMENTS

| | | |
|---|---|---|
| KR | 10-2020-0132008 | 11/2020 |
| KR | 10-2022-0017203 | 2/2022 |
| KR | 10-2022-0017244 | 2/2022 |

* cited by examiner

METHOD AND APPARATUS FOR SWITCHING DISPLAY DISPLAYING SCREEN OF APPLICATION BETWEEN PLURALITY OF DISPLAYS

CROSS-REFERENCE TO RELATED APPLICATIONS

This application is a continuation application of International Application No. PCT/KR2023/006811 designating the United States, filed on May 19, 2023, in the Korean Intellectual Property Receiving Office and claiming priority to Korean Patent Application No. 10-2022-0106376, filed on Aug. 24, 2022, and Korean Patent Application No. 10-2022-0110840, filed on Sep. 1, 2022, in the Korean Intellectual Property Office, the disclosures of each of which are incorporated by reference herein in their entireties.

BACKGROUND

1. Field

The disclosure relates to switching a display displaying a screen of an application between a plurality of displays.

2. Description of Related Art

The development of electronic technology has accelerated the development and distribution of electronic products of various types. For example, a transformable electronic device (e.g., a foldable type electronic device) is being developed.

SUMMARY

According to an example embodiment, an electronic device includes a display module including a main display and a sub-display. The electronic device includes a memory configured to store computer-executable instructions. The electronic device includes a processor configured to execute the instructions by accessing the memory. The instructions, when executed, may cause the processor to, in response to a state of the electronic device that is executing an application being changed to a partially unfolded intermediate state, display a graphic object associated with switching a screen display of the application from the main display to the sub-display on a partial area of the main display. The instructions, when executed, may cause the processor to, in response to the graphic object being displayed in a specified position on the partial area before the state of the electronic device is changed to a folded state, display a screen of the application on the sub-display.

According to an example embodiment, a method performed by an electronic device includes, in response to a state of the electronic device that is executing an application being changed to a partially unfolded intermediate state, displaying a graphic object associated with switching a screen display of the application from a main display of a display module to a sub-display of the display module on a partial area of the main display. The method performed by the electronic device may include, in response to the graphic object being displayed in a specified position on the partial area before the state of the electronic device is changed to a folded state, displaying a screen of the application on the sub-display.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
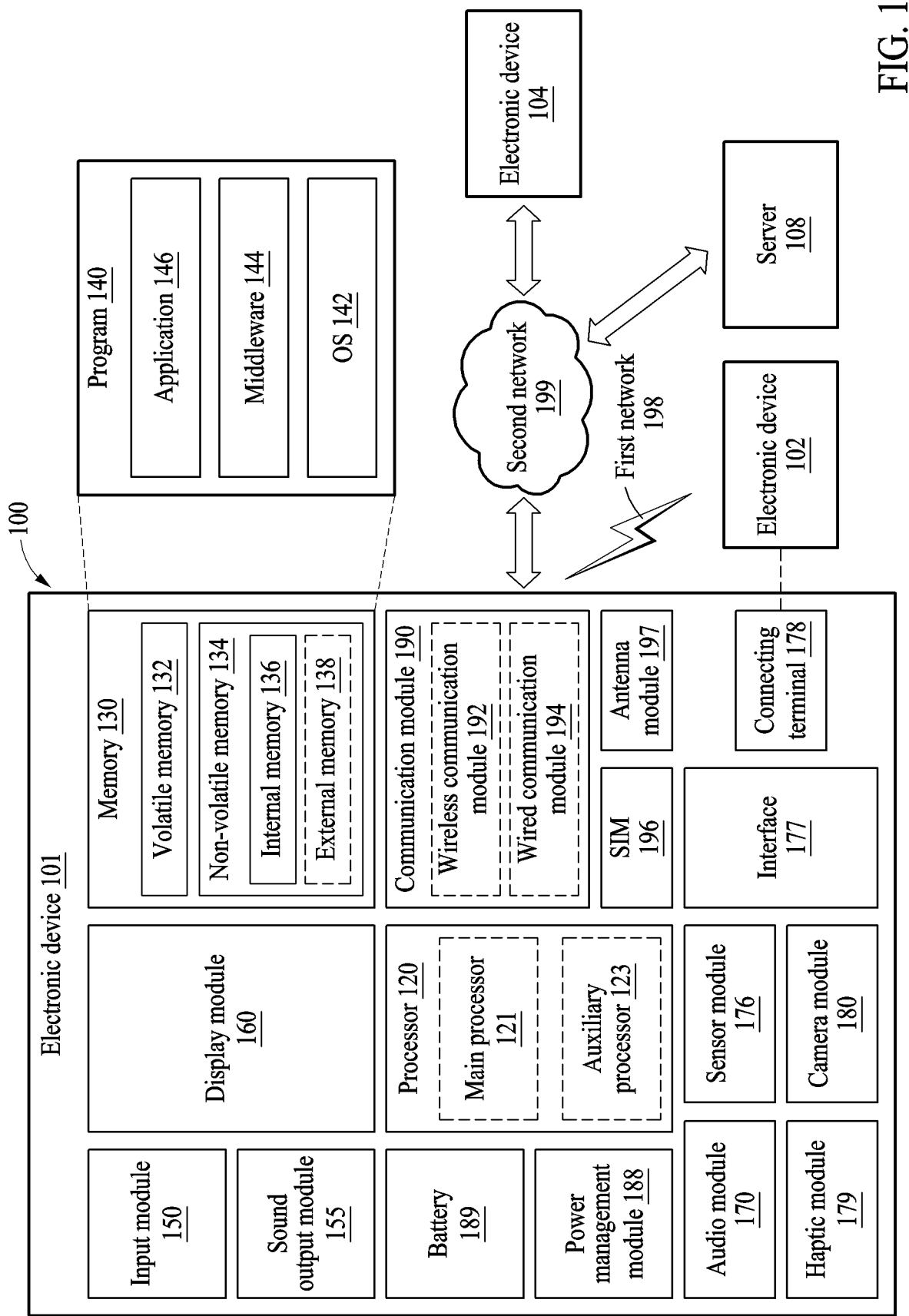
FIG. 1 is a block diagram illustrating an example electronic device in a network environment according to various embodiments.

Hereinafter, various example embodiments will be described in greater detail with reference to the accompanying drawings. When describing the embodiments with reference to the accompanying drawings, like reference numerals refer to like components and a repeated description related thereto may not be repeated.

FIG. 1 is a block diagram illustrating an example electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for processing of an artificial intelligence model. The artificial intelligence model may be generated by machine learning. Such learning may be performed by, for example, the electronic device 101 in which artificial intelligence is performed, or performed via a separate server (e.g., the server 108). A learning algorithm may include, but is not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more thereof, but is not limited thereto. The artificial intelligence model may additionally or alternatively include a software structure other than the hardware structure.

The memory 130 may store a variety of data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to detect a touch, or a pressure sensor adapted to measure the intensity of force incurred by the touch.

The audio module 170 may convert a sound into an electric signal or vice versa. According to an embodiment, the audio module 170 may obtain the sound via the input module 150, or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196. For reference, the communication module may establish communication with a target device (e.g., the electronic device 104) for mirroring display.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to embodiments, the antenna module 197 may form a mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or MEC. The external electronic device 104 may be a target device with a target display that may output an image. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
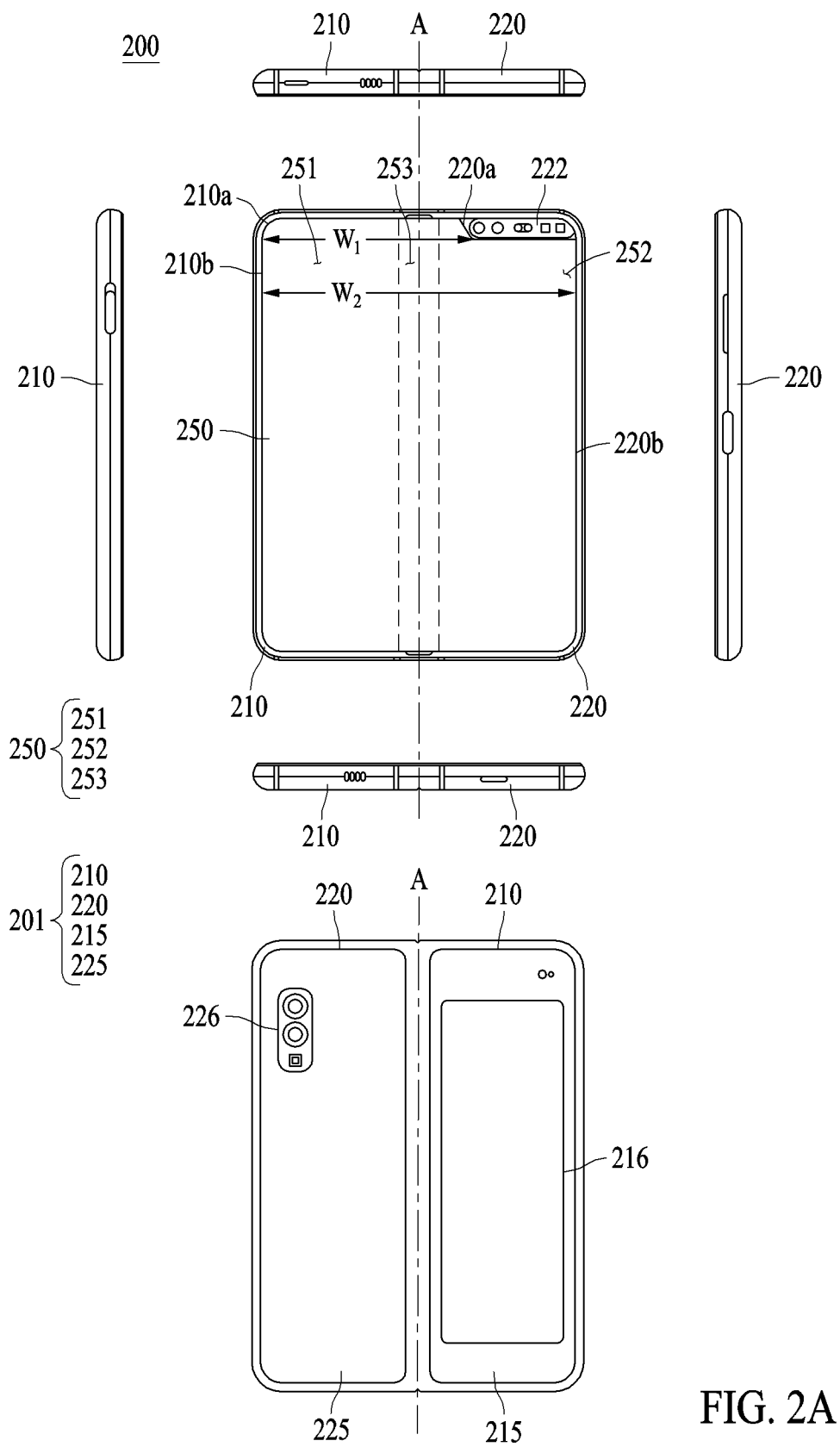
FIG. 2A is a diagram illustrating an unfolded state of an electronic device according to various embodiments.
Figure 2B:
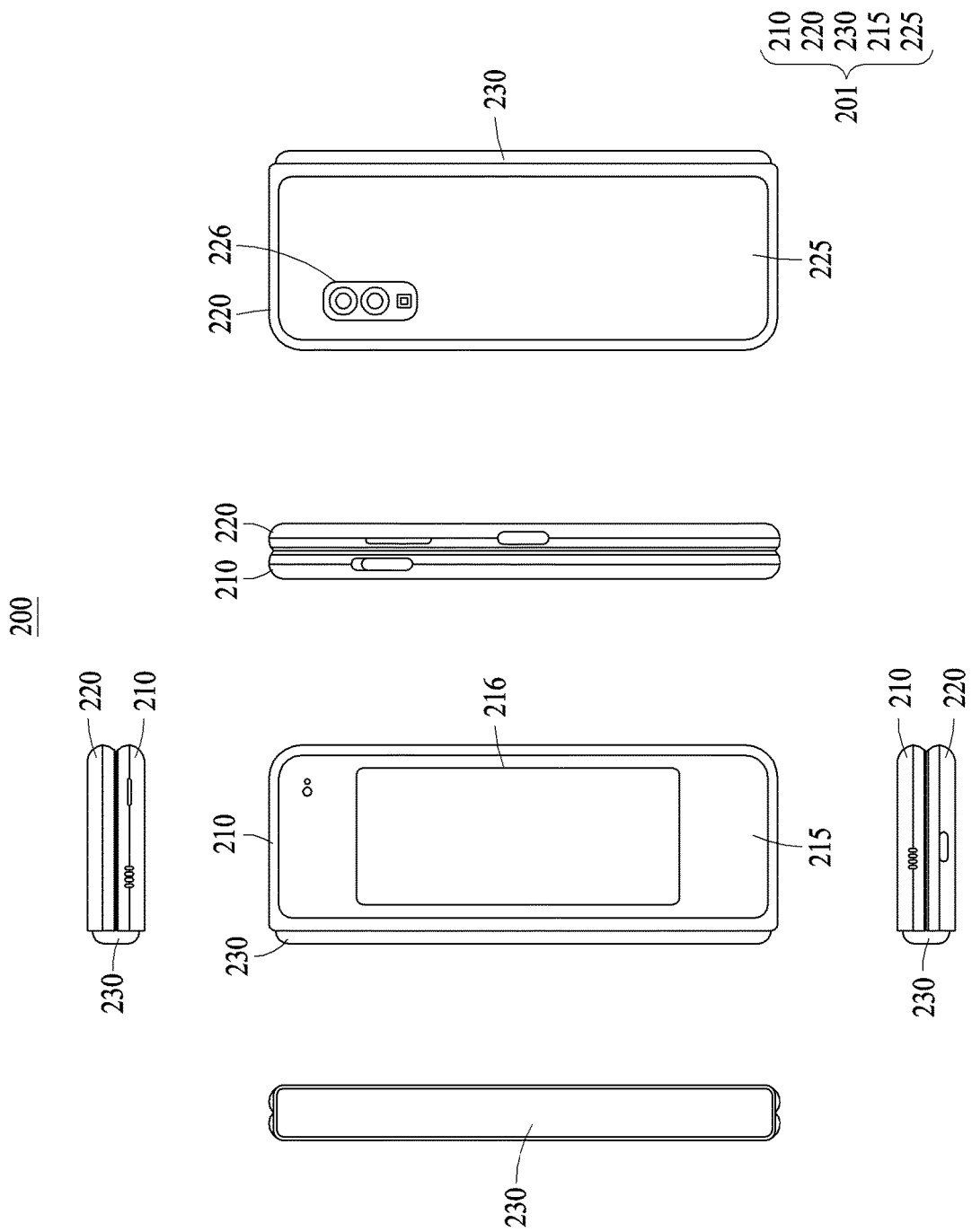
FIG. 2B is a diagram illustrating a folded state of an electronic device according to various embodiments.
Figure 2C:
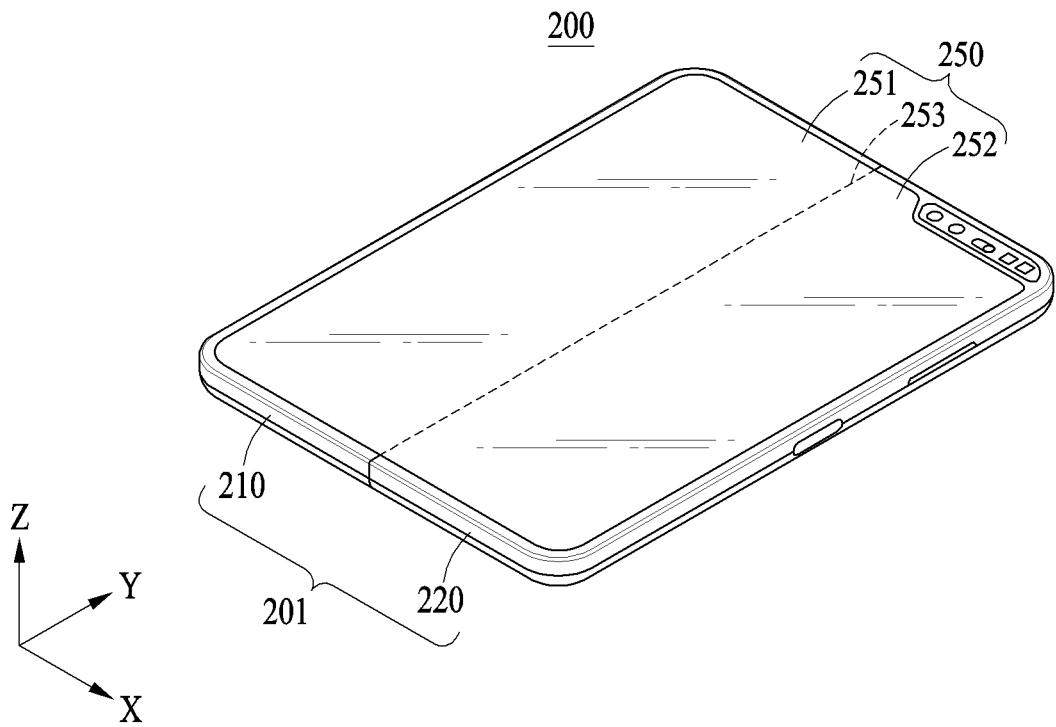
FIGS. 2C and 2D are perspective views illustrating an example of a fully unfolded state and a partially unfolded intermediate state of an electronic device according to various embodiments.
Figure 2D:
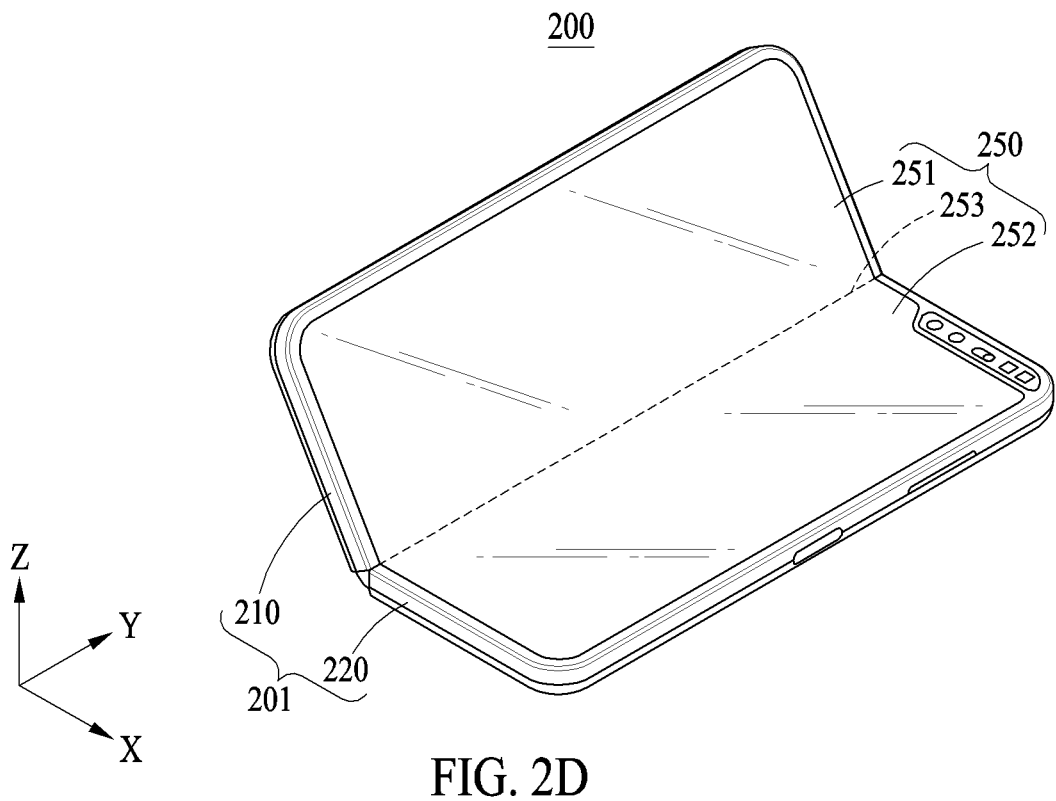
Figure 3A:
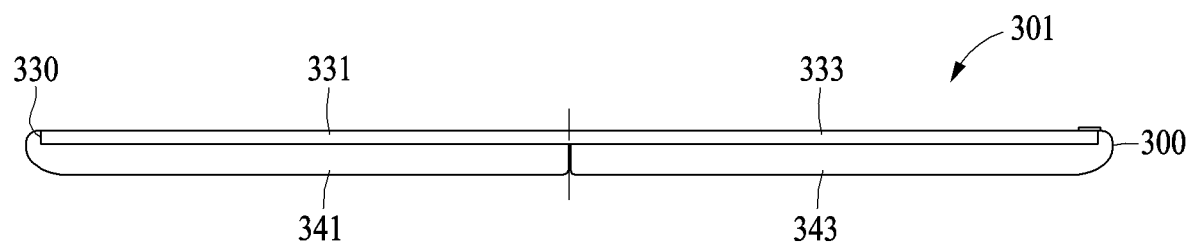
FIGS. 3A, 3B, 3C and 3D are diagrams illustrating a fully unfolded state, a partially unfolded intermediate state, and a fully folded state of an electronic device according to various embodiments.
Figure 3B:
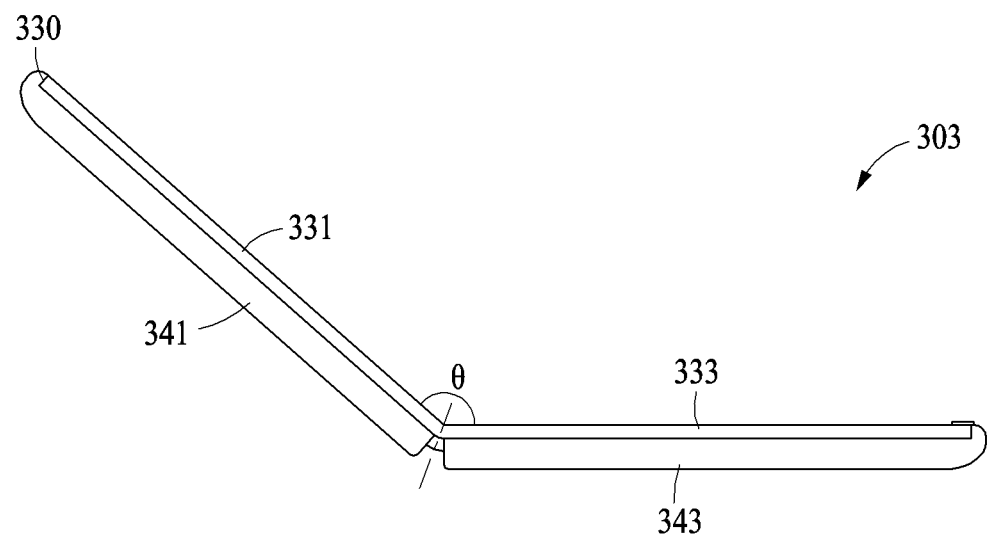
Figure 3C:
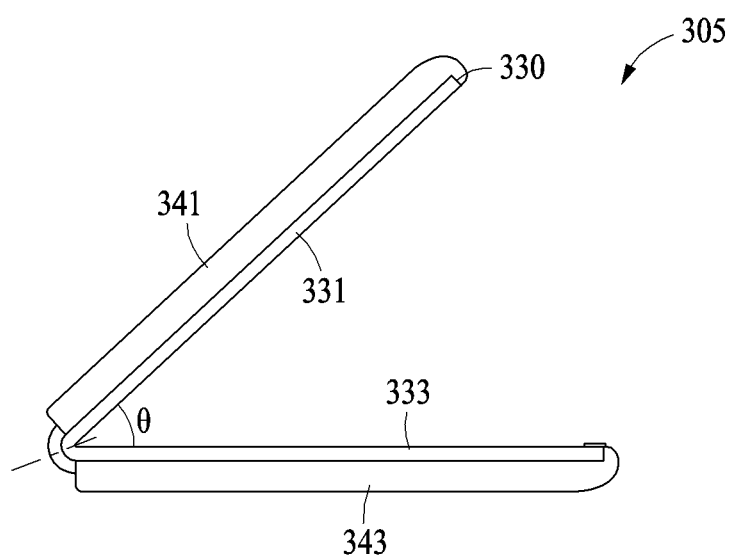
Figure 3D:
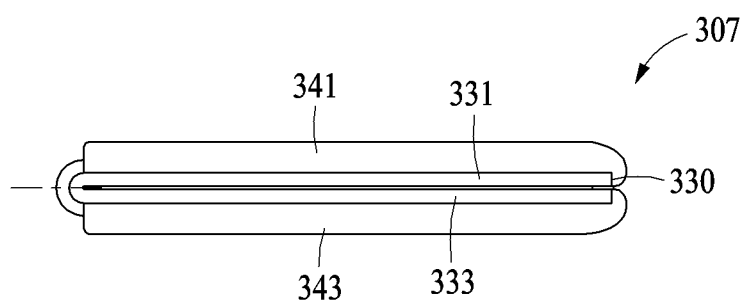

FIG. 2A is a diagram illustrating an unfolded state of an electronic device 200 according to various embodiments. FIG. 2B is a diagram illustrating a folded state of the electronic device 200 according to various embodiments. FIGS. 2C and 2D are perspective views illustrating an example of a fully unfolded state and a partially unfolded intermediate state (hereinafter, referred to as an "intermediate state") of the electronic device 200 according to various embodiments.

The electronic device 200 of FIGS. 2A and 2B is an example of the electronic device 101 of FIG. 1, and may be a foldable or bendable electronic device.

In FIG. 2C, FIG. 2D and other following drawings, illustrated is a spatial coordinate system defined by an X-axis, a Y-axis, and a Z-axis that are orthogonal to each other. Here, the X-axis may represent a width direction of an electronic device, the Y-axis may represent a length direction of the electronic device, and the Z-axis may represent a height (or thickness) direction of the electronic device. In the following description, a "first direction" may refer to a direction parallel to the Z-axis.

Referring to FIGS. 2A and 2B, in an embodiment, the electronic device 200 may include a foldable housing 201, and a flexible or foldable display 250 (hereinafter, the "display" 250 in short) (e.g., the display module 160 of FIG. 1) disposed in a space formed by the foldable housing 201. A surface on which the display 250 is disposed (or a surface on which the display 250 is viewed from the outside of the electronic device 200) may be defined as a front surface of the electronic device 200. In addition, a surface opposite to the front surface may be defined as a rear surface of the electronic device 200. In addition, a surface surrounding a space between the front surface and the rear surface may be defined as a side surface of the electronic device 200.

According to an embodiment, the foldable housing 201 may include a first housing structure 210, a second housing structure 220 including a sensor area 222, a first rear cover 215, a second rear cover 225, and a hinge structure 230. Here, the hinge structure 230 may include a hinge cover that covers a foldable portion of the foldable housing 201. The foldable housing 201 of the electronic device 200 is not limited to the shape and combination shown in FIGS. 2A and 2B, and may be implemented in a different shape or a different combination of components. For example, in an embodiment, the first housing structure 210 and the first rear cover 215 may be integrally formed, and the second housing structure 220 and the second rear cover 225 may be integrally formed.

According to an embodiment, the first housing structure 210 may be connected to the hinge structure 230, and may include a first surface facing a first direction, and a second surface facing a second direction opposite to the first direction. The second housing structure 220 may be connected to the hinge structure 230 and may include a third surface facing a third direction and a fourth surface facing a fourth direction opposite to the third direction. The second housing structure 220 may rotate with respect to the first housing structure 210 about the hinge structure 230. A state of the electronic device 200 may be changed to a folded state or an unfolded state.

According to an embodiment, the first surface may face the third surface in a state in which the electronic device 200 is fully folded, and the third direction may be identical to the first direction in a state in which the electronic device 200 is fully unfolded.

According to an embodiment, the first housing structure 210 and the second housing structure 220 may be disposed on both sides with respect to a folding axis A and generally may be symmetrical with respect to the folding axis A. As to be described hereinafter, an angle or distance between the first housing structure 210 and the second housing structure 220 may vary according to whether the state of the electronic device 200 is the unfolded state, the folded state, or an intermediate state (e.g., a partially folded state or a partially unfolded state). According to an embodiment, unlike the first housing structure 210, the second housing structure 220 may additionally include the sensor area 222, in which various sensors are arranged. However, the first housing structure 210 and the second housing structure 220 may have shapes symmetrical to each other in areas other than the sensor area 222.

According to an embodiment, as shown in FIG. 2A, the first housing structure 210 and the second housing structure 220 may together form a recess for accommodating the display 250. In an embodiment, due to the sensor area 222, the recess may have at least two different widths in a direction perpendicular to the folding axis A. For example, the recess may have a first width w1 between a first portion 210a of the first housing structure 210 parallel to the folding axis A and a first portion 220a of the second housing structure 220 formed on a periphery of the sensor area 222, and a second width w2 formed by a second portion 210b of the first housing structure 210 and a second portion 220b of the second housing structure 220 not corresponding to the sensor area 222 and being parallel to the folding axis A. In this case, the second width w2 may be greater than the first width w1. In an embodiment, the first portion 220a and the second portion 220b of the second housing structure 220 may be at different distances from the folding axis A. The widths of the recess are not limited to the shown example. In an embodiment, the recess may have a plurality of widths due to the shape of the sensor area 222 or asymmetrical portions of the first housing structure 210 and the second housing structure 220. According to an embodiment, the sensor area 222 may be formed to have a predetermined (e.g., specified) area adjacent to one corner of the second housing structure 220. However, the arrangement, shape, and size of the sensor area 222 are not limited to the shown example. For example, in an embodiment, the sensor area 222 may be provided at another corner of the second housing structure 220 or in a predetermined area between an upper corner and a lower corner. In an embodiment, components embedded in the electronic device 200 to perform various functions may be exposed to the front surface of the electronic device 200 through the sensor area 222 or through one or more openings provided in the sensor area 222. In an embodiment, the components may include various types of sensors. The sensors may include, for example, at least one of a front camera, a receiver, or a proximity sensor. According to an embodiment, the sensor area 222 may not be included in the second housing structure 220 or may be formed at a position different from that shown in the drawings.

According to an embodiment, at least a portion of the first housing structure 210 and the second housing structure 220 may be formed of a metal material or a non-metal material having a selected magnitude of rigidity to support the display 250. At least a portion of the first housing structure 210 and the second housing structure 220 formed of the metal material may provide a ground plane for the electronic device 200, and may be electrically connected to a ground line formed on a PCB disposed in the foldable housing 201.

According to an embodiment, the first rear cover 215 may be disposed on one side of the folding axis A on the rear surface of the electronic device 200, and may have, for example, a substantially rectangular periphery that may be enclosed by the first housing structure 210. Similarly, the second rear cover 225 may be disposed on another side of the folding axis A on the rear surface of the electronic device 200, and may have a periphery that may be enclosed by the second housing structure 220.

According to an embodiment, the first rear cover 215 and the second rear cover 225 may be substantially symmetrical with respect to the folding axis A. However, the first rear cover 215 and the second rear cover 225 are not necessarily mutually symmetrical. For example, the first rear cover 215 and the second rear cover 225 in the electronic device 200 may have various shapes. In an embodiment, the first rear cover 215 may be formed integrally with the first housing structure 210, and the second rear cover 225 may be formed integrally with the second housing structure 220.

According to an embodiment, the first rear cover 215, the second rear cover 225, the first housing structure 210, and the second housing structure 220 may form a space in which various components (e.g., a PCB, or a battery) of the electronic device 200 are to be arranged. In an embodiment, one or more components may be disposed or visually exposed on the rear surface of the electronic device 200. For example, at least a portion of a sub-display may be visually exposed through a first rear area 216 of the first rear cover 215. In an embodiment, one or more components or sensors may be visually exposed through a second rear area 226 of the second rear cover 225. In an embodiment, the sensors may include a proximity sensor and/or a rear camera.

According to an embodiment, a front camera exposed to the front surface of the electronic device 200 through one or more openings provided in the sensor area 222, or a rear camera exposed through the second rear area 226 of the second rear cover 225 may include one or more lenses, an image sensor, and/or an ISP. A flash may include, for example, a light emitting diode (LED) or a xenon lamp. In various embodiments, two or more lenses (e.g., infrared camera, wide-angle, and telephoto lenses) and image sensors may be arranged on one surface of the electronic device 200.

Referring to FIG. 2B, the hinge cover may be disposed between the first housing structure 210 and the second housing structure 220 to cover internal components (e.g., the hinge structure 230). According to an embodiment, the hinge structure 230 may be covered by a portion of the first housing structure 210 and a portion of the second housing structure 220, or may be exposed to the outside, depending on the state (e.g., the unfolded state, the intermediate state, or the folded state) of the electronic device 200.

In an example, when the electronic device 200 is in the unfolded state (e.g., a fully unfolded state) as illustrated in FIG. 2A, the hinge structure 230 may be covered by the first housing structure 210 and the second housing structure 220 not to be exposed. In another example, when the electronic device 200 is in the folded state (e.g., a fully folded state) as illustrated in FIG. 2B, the hinge structure 230 may be exposed to the outside, being between the first housing structure 210 and the second housing structure 220. In another example, when the first housing structure 210 and the second housing structure 220 are in an intermediate state of being folded with a predetermined angle, the hinge cover 230 may be partially exposed to the outside, being between the first housing structure 210 and the second housing structure 220. However, in this example, the exposed area may be less than that in the fully folded state. In an embodiment, the hinge cover 230 may have a curved surface.

According to an embodiment, the display 250 may be disposed in a space formed by the foldable housing 201. For example, the display 250 may be seated on the recess formed by the foldable housing 201 and may be viewed from the outside through the front surface of the electronic device 200. For example, the display 250 may include most of the front surface of the electronic device 200. Accordingly, the front surface of the electronic device 200 may include the display 250, and a partial area of the first housing structure 210 and a partial area of the second housing structure 220, which are adjacent to the display 250. In addition, the rear surface of the electronic device 200 may include the first rear cover 215, a partial area of the first housing structure 210 adjacent to the first rear cover 215, the second rear cover 225, and a partial area of the second housing structure 220 adjacent to the second rear cover 225.

According to an embodiment, the display 250 may refer to a display having at least a partial area that is deformable into a flat surface or a curved surface. In an embodiment, the display 250 may include a folding area 253, a first area 251 disposed on one side of the folding area 253 (e.g., on the left side of the folding area 253 shown in FIG. 2A), and a second area 252 disposed on the other side of the folding area 253 (e.g., on the right side of the folding area 253 shown in FIG. 2A).

However, such an area division of the display 250 shown in FIG. 2A is merely an example, and the display 250 may be divided into a plurality of areas (e.g., four or more areas, or two areas) depending on a structure or functions thereof. In an example, as shown in FIG. 2A, the display 250 may be divided into areas based on the folding area 203 extending in parallel to the folding axis A. In another example, the display 250 may be divided into areas based on another folding axis (e.g., a folding axis parallel to a width direction of an electronic device).

According to an embodiment, the display 250 may be coupled to or disposed adjacent to a touch panel including a touch sensing circuit and a pressure sensor for measuring a strength (a pressure) of a touch. For example, the display 250 may be coupled to or disposed adjacent to a touch panel for detecting a stylus pen of an electromagnetic resonance (EMR) type, as an example of the touch panel.

According to an embodiment, the first area 251 and the second area 252 may have globally symmetrical shapes around the folding area 253. However, unlike the first area 251, the second area 252 may include a notch that is cut depending on a presence of the sensor area 222, but may have a shape symmetrical to the first area 251 in the other areas. For example, the first area 251 and the second area 252 may include portions having mutually symmetrical shapes and portions having mutually asymmetrical shapes.

According to an embodiment, an edge thickness of each of the first area 251 and the second area 252 may be different from an edge thickness of the folding area 253. The edge thickness of the folding area 253 may be less than those of the first area 251 and the second area 252. In an example, the first area 251 and the second area 252 may be asymmetrical in terms of thickness when the first area 251 and the second area 252 are cross-sectionally viewed. For example, an edge of the first area 251 may be formed to have a first radius of curvature, and an edge of the second area 252 may be formed to have a second radius of curvature different from the first radius of curvature. In another example, the first area 251 and the second area 252 may be symmetrical in terms of thickness when the first area 251 and the second area 252 are cross-sectionally viewed.

Hereinafter, each area of the display 250, and operations of the first housing structure 210 and the second housing structure 220 depending on the state (e.g., the folded state, the unfolded state, or the intermediate state) of the electronic device 200 will be described.

According to an embodiment, when the electronic device 200 is in the unfolded state (e.g., FIG. 2A), the first housing structure 210 and the second housing structure 220 may be arranged to face the same direction while forming an angle of 180 degrees. The surface of the first area 251 and the surface of the second area 252 in the display 250 may face the same direction (e.g., a front direction of an electronic device), forming 180 degrees. The folding area 253 may form the same plane as the first area 251 and the second area 252.

According to embodiments, when the electronic device 200 is in the folded state (e.g., FIG. 2B), the first housing structure 210 and the second housing structure 220 may be arranged to face each other. The surface of the first area 251 and the surface of the second area 252 in the display 250 may face each other, forming a narrow angle (e.g., between 0 degrees and 10 degrees). At least a portion of the folding area 253 may include a curved surface having a predetermined curvature.

According to an embodiment, when the electronic device 200 is in the intermediate state, the first housing structure 210 and the second housing structure 220 may be arranged to form a predetermined angle therebetween. The surface of the first area 251 and the surface of the second area 252 in the display 250 may form an angle greater than that in the folded state and less than that in the unfolded state. At least a portion of the folding area 253 may include a curved surface having a predetermined curvature, and the curvature may be less than that in the folded state.

FIG. 2C illustrates the fully unfolded state of the electronic device 200, and FIG. 2D illustrates the partially unfolded intermediate state of the electronic device 200. As described above, the state of the electronic device 200 may be changed to the folded state or the unfolded state. According to an embodiment, when viewed in a direction of a folding axis (e.g., the folding axis A of FIG. 2A), the electronic device 200 may be folded in two types, e.g., an "in-folding" type in which the front surface of the electronic device 200 is folded to form an acute angle, and an "out-folding" type in which the front surface of the electronic device 200 is folded to form an obtuse angle. In an example, in the state in which the electronic device 200 is folded in the in-folding type, the first surface of the first housing structure 210 may face the third surface of the second housing structure 220. In the fully unfolded state, the first surface of the first housing structure 210 and the third surface of the second housing structure 220 may face the same direction (e.g., a direction parallel to the Z-axis).

In another example, when the electronic device 200 is folded in the out-folding type, the second surface of the first housing structure 210 may face the fourth surface of the second housing structure 220.

In addition, although not shown in the drawings, the electronic device 200 may include a plurality of hinge axes (e.g., two parallel hinge axes including the folding axis A of FIG. 2A and another axis parallel to the folding axis A). In this example, the electronic device 200 may also be folded in a "multi-folding" type in which the in-folding type and the out-folding type are combined.

The in-folding type may refer to a state in which the display 250 is not exposed to the outside in the fully folded state. The out-folding type may refer to a state in which the display 250 is exposed (e.g., visible) to the outside in the fully folded state. FIG. 2D shows the intermediate state in which the electronic device 200 is partially unfolded in an in-folding process.

Although the state in which the electronic device 200 is folded in the in-folding type will be described below for convenience's sake, it should be noted that the description may be similarly applied to the state in which the electronic device 200 is folded in the out-folding type.

FIGS. 3A, 3B, 3C and 3D are diagrams illustrating a fully unfolded state, a partially unfolded intermediate state, and a fully folded state of an electronic device according to various embodiments.

Referring to FIGS. 3A, 3B, 3C and 3D, an electronic device 300 (e.g., the electronic device 101 of FIG. 1 or the electronic device 200 of FIGS. 2A through 2D) may include a foldable display 330 (e.g., the display module 160 of FIG. 1 or the display 250 of FIGS. 2A through 2D), a first housing 341, and a second housing 343.

A state 301 may indicate a fully unfolded state or an unfolded state of the electronic device 300.

In the state 301, the electronic device 300 may be folded. For example, as the first housing 341 and/or the second housing 343 are folded, the electronic device 300 may be folded.

According to an embodiment, as the electronic device 300 is folded, a first area 331 and a second area 333 of the foldable display 330 may form an angle θ based on a folding axis as in states 303 and 305. When the angle θ is within a predetermined range, the states 303 and 305 may also be referred to as "partially unfolded intermediate states", and the angle θ formed by the first area 331 and the second area 333 may also be referred to as a "folding angle".

According to an embodiment, the folding angle in the partially unfolded intermediate state 303 may be about 135 degrees, and the folding angle in the partially unfolded intermediate state 305 may be about 45 degrees.

A state 307 may be a state in which the electronic device 300 is fully folded.

In the example shown in FIGS. 3A, 3B, 3C and 3D, the electronic device 300 may be folded such that the first area 331 and the second area 333 may face each other. In other words, a screen may be folded inwards. The above folding scheme may also be referred to as an in-folding scheme. Alternatively, the electronic device 300 may be folded such that the first area 331 and the second area 333 may be oriented in opposite directions. In other words, the screen may be folded outwards.

Figure 4:
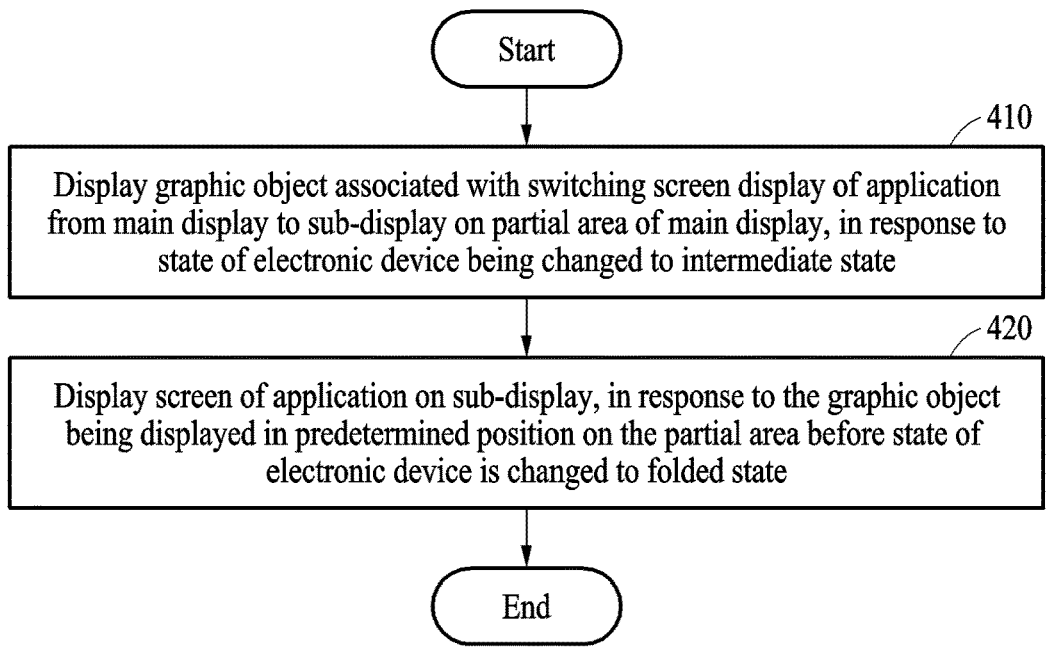
FIG. 4 is a flowchart illustrating an example screen display operation of an electronic device according to various embodiments.

FIG. 4 is a flowchart illustrating an example screen display operation of an electronic device according to various embodiments.

In operation 410, an electronic device (e.g., the electronic device 101 of FIG. 1, and the electronic device 200 of FIGS. 2A through 2D) may display a graphic object on a partial area of a main display, in response to a state of the electronic device that is executing an application being changed to a partially unfolded intermediate state.

According to an embodiment, the graphic object may include a graphic object to provide a user with visual feedback associated with a determination of a display (e.g., the main display or a sub-display) on which a screen of an application is to be displayed. The electronic device may include a display module including a main display and a sub-display. In response to the state of the electronic device being at least one of an unfolded state or an intermediate state, the electronic device may activate the main display (e.g., the display 250 of FIGS. 2A through 2D). In response to the electronic device being in a folded state, the electronic device may activate the sub-display (e.g., a sub-display exposed (e.g., visible) through the first rear area 216 of the first rear cover 215 of FIGS. 2A through 2D). For example, the graphic object may include a graphic object associated with switching a screen display of an application being executed by the electronic device from the main display to the sub-display when the state of the electronic device is changed from the intermediate state to the folded state.

According to an embodiment, the graphic object may be used to inform a user of whether the screen of the application is to be displayed on the sub-display when the electronic device is in the folded state, according to a position in which the graphic object is displayed when the electronic device is in the intermediate state. In an example, when the graphic object is displayed in a predetermined position before the state of the electronic device is changed to the folded state, the electronic device may display the screen of the application on the sub-display. In another example, when the state of the electronic device is changed to the folded state before the graphic object is displayed in the predetermined position, the electronic device may skip displaying the screen of the application on the sub-display.

As a result, the user may determine whether the screen of the application is to be displayed on the sub-display when the electronic device is in the folded state, depending on whether the graphic object is displayed in the predetermined position when the electronic device is in the intermediate state. In addition, the user may determine whether to display the screen of the application on the sub-display according to intention of the user, by adjusting a speed and/or a point in time at which the state of the electronic device is changed to the folded state. For example, the user may maintain the intermediate state of the electronic device until the graphic object is displayed in the predetermined position so that the electronic device may display the screen of the application on the sub-display. After the graphic object is displayed in the predetermined position, the user may change the state of the electronic device to the folded state. For example, the user may quickly change the state of the electronic device so that the electronic device may skip displaying the screen of the application on the sub-display, thereby changing the state of the electronic device to the folded state before the graphic object is displayed in the predetermined position.

In operation 420, the electronic device may display the screen of the application on the sub-display, in response to the graphic object being displayed in the predetermined position before the state of the electronic device is changed to the folded state. The electronic device may switch the screen display of the application from the main display to the sub-display, in response to the graphic object being displayed in the predetermined position before the state of the electronic device is changed to the folded state. If the electronic device is in at least one of the unfolded state or the partially unfolded intermediate state, the electronic device may display the screen of the application on the main display. The electronic device may display the graphic object in a predetermined position of the main display, and when the state of the electronic device is changed to the folded state, display the screen of the application on the sub-display.

According to an embodiment, when the screen of the application is displayed on the sub-display, the electronic device may maintain execution of the application. The electronic device may play an output including a sound generated while the application is being executed. To provide a user with a notification generated during the execution of the application, the electronic device may play a sound corresponding to the notification or generate a vibration corresponding to the notification. In response to a screen display termination input being received from the user, the electronic device may stop displaying the screen of the application on the sub-display. In response to a user input to adjust a display order of the screen of the application being detected, the electronic device may adjust the order of the screen of the application and other screens (e.g., screens of other applications, widget screens, etc.).

According to an embodiment, the electronic device may set whether to display the screen of the application being executed on the sub-display according to a user input when the state of the electronic device is changed to the folded state. For example, in response to the state of the electronic device being changed to the folded state, the electronic device may be set to skip the displaying of the screen of the application on the sub-display, according to a user input. The electronic device may display the graphic object independently of the setting according to the user input described above. For example, even when the displaying of the screen of the application on the sub-display is set to be skipped according to a user input, the electronic device may display the graphic object. The electronic device may display the screen of the application on the sub-display independently of the setting according to the user input described above. For example, in response to the graphic object being displayed in a predetermined position on a partial area before the state of the electronic device is changed to the folded state even when the electronic device is set to skip the displaying of the screen of the application on the sub-display according to a user input, the electronic device may display the screen of the application on the sub-display.

According to an embodiment, in response to the electronic device being in the folded state, the electronic device may stop displaying the graphic object on a partial area of the main display. The electronic device may determine one of the main display and the sub-display, which is to be activated according to the state of the electronic device. For example, when the state of the electronic device is at least one of the unfolded state or the partially unfolded intermediate state, the electronic device may activate the main display and deactivate the sub-display. When the electronic device is in the folded state, the main display may be deactivated, and the sub-display may be activated. In response to the electronic device being in the folded state, the electronic device may deactivate the main display to stop displaying the graphic object that has been displayed on a partial area of the main display.

Although not explicitly shown in FIG. 4, the electronic device may skip the displaying of the screen of the application on the sub-display in response to the state of the electronic device being changed to the folded state before the graphic object is displayed in the predetermined position. For example, when being in the intermediate state, the electronic device may not display the graphic object in the predetermined position. The state of the electronic device may be changed to the folded state. When the electronic device is in the folded state, the electronic device may skip the displaying of the screen of the application on the sub-display.

Figure 5:
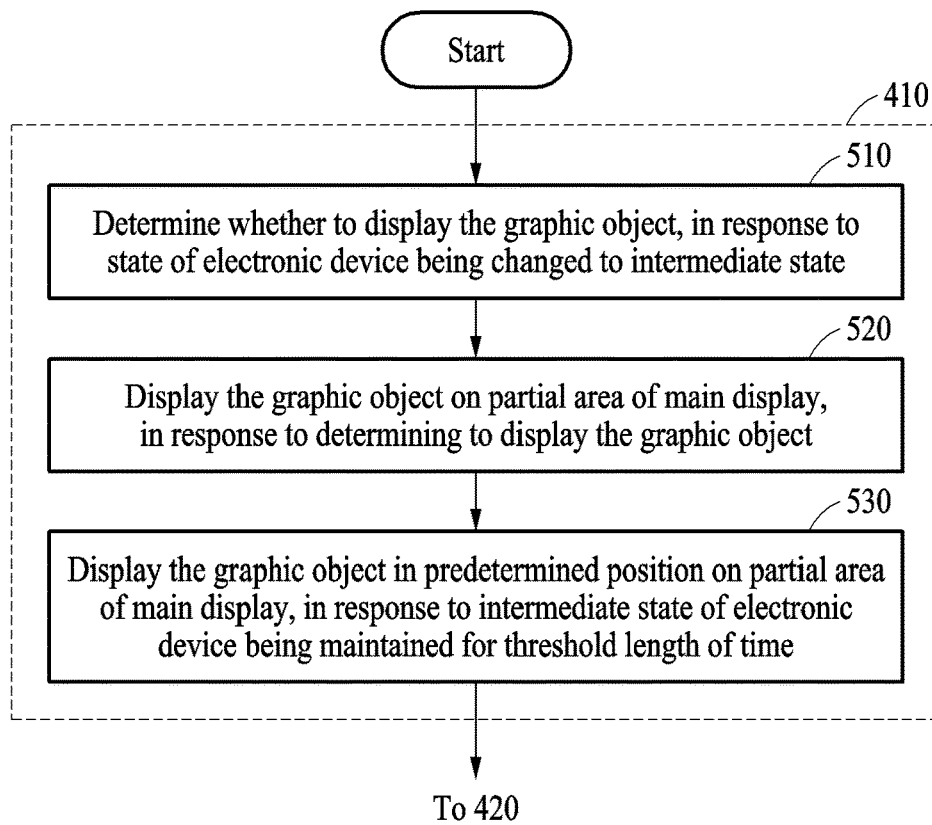
FIG. 5 is a flowchart illustrating an example operation of an electronic device to display a graphic object according to various embodiments.

FIG. 5 is a flowchart illustrating an example operation of an electronic device to display a graphic object according to various embodiments.

In operation 510, an electronic device (e.g., the electronic device 101 of FIG. 1, and the electronic device 200 of FIGS. 2A through 2D) may determine whether to display a graphic object, in response to a state of the electronic device being changed to an intermediate state.

For example, the electronic device may determine whether to display the graphic object, based on at least one of a speed or an acceleration at which the state of the electronic device is changed to the intermediate state. For example, when at least one of receiving an input from a user, playing continuous content, or detecting an interaction from the user is currently performed at a point in time at which the state of the electronic device is changed to the intermediate state, the electronic device may determine to display the graphic object. An operation of determining whether to display a graphic object will be described in greater detail below with reference to FIG. 7.

In operation 520, the electronic device may display the graphic object on a partial area of the main display, in response to determining to display the graphic object. The electronic device may display the graphic object on a partial area determined in consideration of a gaze of a user among screen areas of the main display.

For example, when the state of the electronic device is the partially unfolded intermediate state, the electronic device may display the graphic object on a partial area of the main display corresponding to a detected gaze of a user.

For example, the electronic device may display the graphic object on a partial area determined in consideration of an area of the main display covered by a first housing structure (e.g., the first housing structure 210 of FIGS. 2A through 2D), when viewed in a direction opposite to a height direction (e.g., a Z-axis direction of FIGS. 2A through 2D) of the electronic device. When the electronic device is in an intermediate state of being folded at a threshold angle (e.g., 45 degrees), the electronic device may display the graphic object on a portion of areas of the main display other than the area covered by the first housing structure.

According to an embodiment, in response to the state of the electronic device being changed to the intermediate state, the electronic device may display the graphic object in a first position on a partial area of the main display. The electronic device may display at least a portion of the graphic object on an area including a point of the main display corresponding to the first position. In response to the intermediate state of the electronic device being maintained for a threshold length of time, the electronic device may display the graphic object in a second position (e.g., a predetermined position) on the partial area of the main display. The electronic device may display at least a portion of the graphic object on an area including a point of the main display corresponding to the second position (e.g., a predetermined position) on the partial area of the main display. For example, in response to the state of the electronic device being changed to an intermediate state in which the electronic device is folded at a threshold folding angle (e.g., 45 degrees), the electronic device may display the graphic object in the first position. In response to the electronic device remaining in an intermediate state in which the electronic device is folded at a folding angle falling within a threshold angle range (e.g., a range of 5 degrees to 45 degrees), the electronic device may display the graphic object in the second position.

For example, in response to the electronic device remaining in the intermediate state in which the electronic device is folded at the folding angle falling within the threshold angle range (e.g., the range of 5 degrees to 45 degrees), the electronic device may change a central position of the graphic object from the first position to the second position, to display the graphic object in the second position.

For example, in response to the electronic device remaining in the intermediate state in which the electronic device is folded at the folding angle falling within the threshold angle range (e.g., the range of 5 degrees to 45 degrees), the electronic device may change a shape of the graphic object to display the graphic object in the second position. In an example, in response to the state of the electronic device being the intermediate state in which the electronic device is folded at the threshold folding angle (e.g., 45 degrees), the electronic device may display the graphic object in the first position. In response to the electronic device remaining in the intermediate state of being folded at the folding angle falling within the threshold angle range (e.g., the range of 5 degrees to 45 degrees), the electronic device may increase an area and/or a length of the displayed graphic object, to display the graphic object across the first position and the second position (e.g., the predetermined position). For example, the electronic device may display the graphic object in an area including a point corresponding to the first position and a point corresponding to the second position (e.g., a predetermined position), to display the graphic object in the second position (e.g., the predetermined position).

An operation of displaying a graphic object on a partial area of the main display by the electronic device will be described in greater detail below with reference to FIGS. 6A and 6B.

Although not explicitly shown in FIG. 5, the electronic device may skip displaying of the graphic object on the main display in response to determining not to display the graphic object.

In operation 530, the electronic device may display the graphic object in a predetermined position on the partial area of the main display, in response to the intermediate state of the electronic device being maintained for the threshold length of time. As described above, the electronic device may display the graphic object in the predetermined position on the partial area of the main display, in response to remaining in the intermediate state in which the electronic device is folded at the folding angle falling within the threshold angle range (e.g., the range of 5 degrees to 45 degrees). The predetermined position may include a position corresponding to a point on the main display in association with whether the electronic device is to display the screen of the application on the sub-display when the electronic device is in the folded state.

Figure 6A:
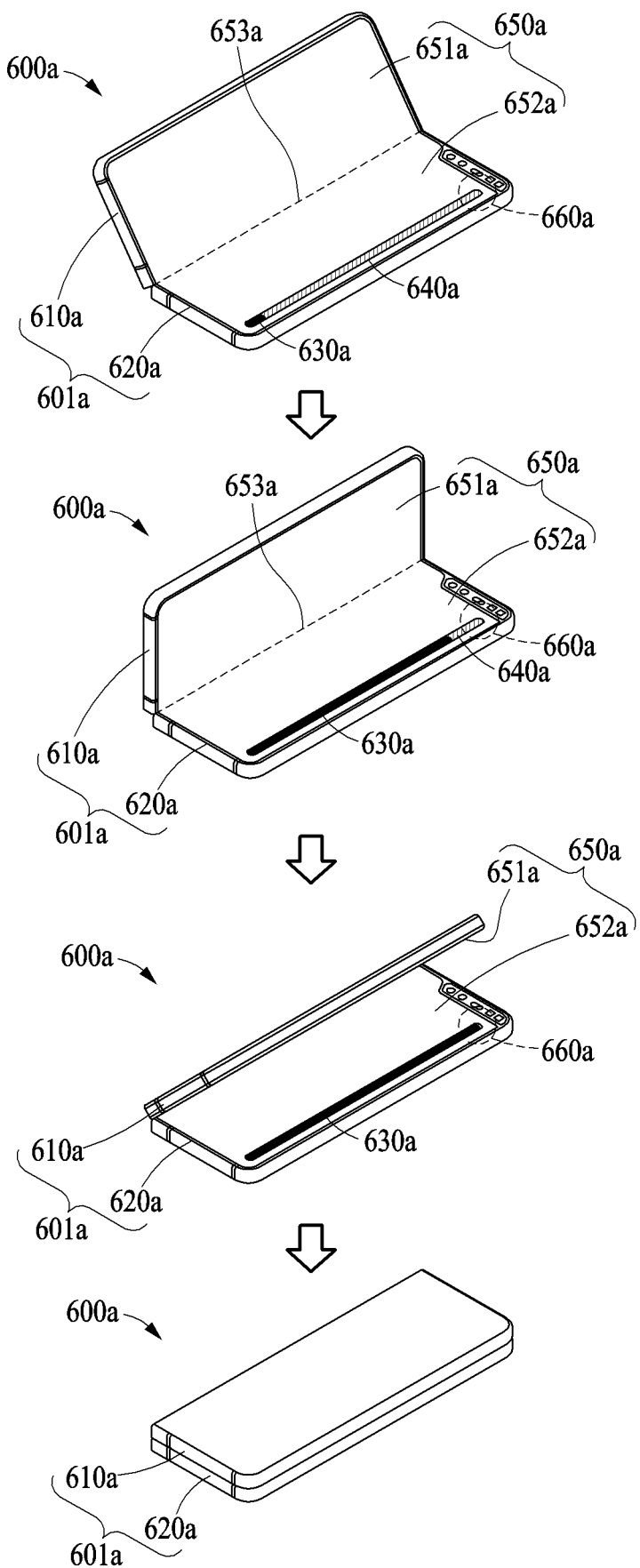
FIG. 6A is a diagram illustrating an example operation of an electronic device to display a graphic object when a folding axis of the electronic device is parallel to a length direction of the electronic device according to various embodiments.

FIG. 6A is a diagram illustrating an example operation of an electronic device to display a graphic object when a folding axis of the electronic device is parallel to a length direction of the electronic device according to various embodiments. FIG. 6B is a diagram illustrating an example operation of an electronic device to display a graphic object when a folding axis of the electronic device is parallel to a width direction of the electronic device according to various embodiments.

Referring to FIG. 6A, a foldable display (e.g., the display 250 of FIGS. 2A through 2D) included in an electronic device 600a (e.g., the electronic device 101 of FIG. 1, and the electronic device 200 of FIGS. 2A through 2D) may have a folding axis extending in a direction (e.g., a vertical direction) parallel to a length direction of the electronic device 600a.

The electronic device 600a may include a main display 650a (e.g., the display module 160 of FIG. 1, and the display 250 of FIGS. 2A through 2D), and a foldable housing 601a. The foldable housing 601a may include a first housing structure 610a, and a second housing structure 620a. The main display 650a may be divided into a first area 651a and a second area 652a based on a folding axis 653a of a hinge. The first area 651a and the second area 652a of the main display 650a may have a rectangular shape with curved corners and a narrow bezel.

Figure 6B:
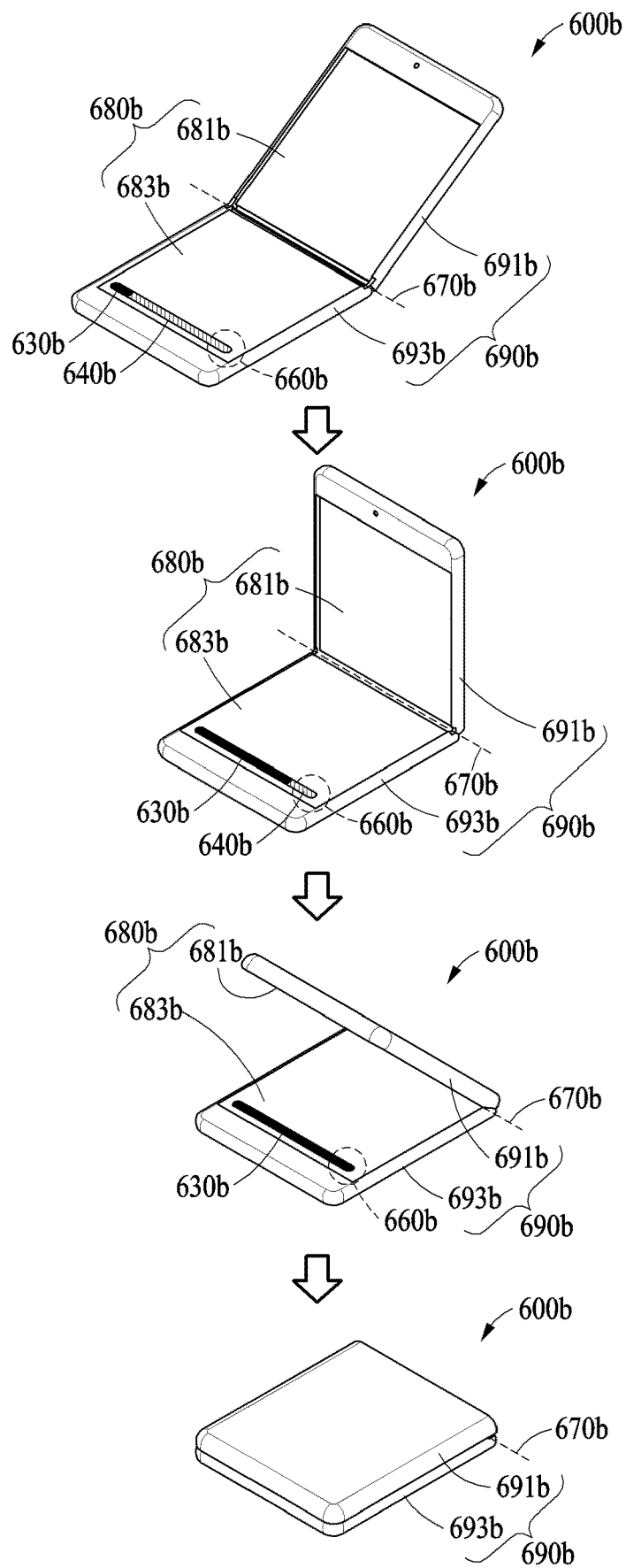
FIG. 6B is a diagram illustrating an example operation of an electronic device to display a graphic object when a folding axis of the electronic device is parallel to a width direction of the electronic device according to various embodiments.

Referring to FIG. 6B, a foldable display (e.g., the display 260 of FIGS. 2A through 2D) included in an electronic device 600b (e.g., the electronic device 101 of FIG. 1, and the electronic device 200 of FIGS. 2A through 2D) may have a folding axis extending in a direction (e.g., a horizontal direction) parallel to a width direction of the electronic device 600b.

The electronic device 600b may include a main display 680b (e.g., the display module 160 of FIG. 1, and the display 250 of FIGS. 2A through 2D), and a foldable housing 690b. The foldable housing 690b may include a first housing structure 691b, and a second housing structure 693b. The main display 680b may be divided into a first area 681b and a second area 683b based on a folding axis 670b of a hinge. The first area 681b and the second area 683b of the main display 680b may have a rectangular shape with curved corners and a narrow bezel.

In response to a state of the electronic device 600a or 600b being changed to a partially unfolded intermediate state during execution of an application, the electronic device 600a or 600b may determine whether to display a graphic object 630a or 630b. The electronic device 600a or 600b may determine to display the graphic object 630a or 630b based on at least one of a speed or an acceleration at which the state of the electronic device 600a or 600b is changed to an intermediate state in which the electronic device 600a or 600b is folded at a threshold folding angle (e.g., 45 degrees). The electronic device 600a or 600b may display the graphic object 630a or 630b on a partial area of the main display 650a or 680b.

According to an embodiment, the partial area may be determined in consideration of an area of the main display 650a or 680b covered by the first housing structure 610a or 691b, when viewed in a direction opposite to a height direction (e.g., the Z-axis direction of FIGS. 2A through 2D) of the electronic device 600a or 600b. For example, the partial area may include areas other than the area of the main display 650a or 680b covered by the first housing structure 610a or 691b, when viewed in the direction opposite to the height direction of the electronic device 600a or 600b, in a partially unfolded state of the electronic device 600a or 600b. In an example, when the electronic device 600a or 600b is in an intermediate state of being folded at a predetermined folding angle (e.g., 30 degrees), the partial area may be determined as areas other than the area of the main display 650a or 680b covered by the first housing structure 610a or 691b, when viewed in the direction opposite to the height direction of the electronic device 600a or 600b.

According to an embodiment, the electronic device 600a or 600b may further display a guide object 640a or 640b together with the graphic object 630a or 630b. The guide object 640a or 640b may include an object to inform a user of a predetermined position 660a or 660b on the main display 650a or 680b. As described above, the predetermined position 660a or 660b may be, for example, a position associated with whether the electronic device 600a or 600b is to switch a screen display of the application from the main display 650a or 680b to a sub-display.

As shown in FIGS. 6A and 6B, the electronic device 600a or 600b may display the graphic object 630a or 630b in a first position on a screen area of the main display 650a or 680b, in response to the state of the electronic device 600a or 600b being changed to the partially unfolded intermediate state. In response to the electronic device 600a or 600b remaining in an intermediate state in which the electronic device is folded at a folding angle falling within a threshold angle range (e.g., a range of 5 degrees to 45 degrees), the electronic device may display a graphic object in a second position (e.g., the predetermined position 660a or 660b). For example, in response to the state of the electronic device 600a or 600b being changed to the intermediate state, the electronic device 600a or 600b may display the graphic object 630a or 630b in the first position. In the intermediate state, the electronic device 600a or 600b may increase and display an area and/or length of the graphic object 630a or 630b. In response to the intermediate state of the electronic device 600a or 600b being maintained for a threshold length of time, the electronic device 600a or 600b may display the graphic object 630a or 630b in the second position (e.g., the predetermined position 660a or 660b).

The electronic device 600a or 600b may display the graphic object 630a or 630b in a predetermined position before the state of the electronic device 600a or 600b is changed to a folded state. In response to the electronic device 600a or 600b being in the folded state, the electronic device 600a or 600b may display a screen of the application on the sub-display. As the state of the electronic device 600a or 600b is changed from the intermediate state to the folded state, the electronic device 600a or 600b may switch the screen display of the application being executed from the main display 650a or 680b to the sub-display.

Figure 7:
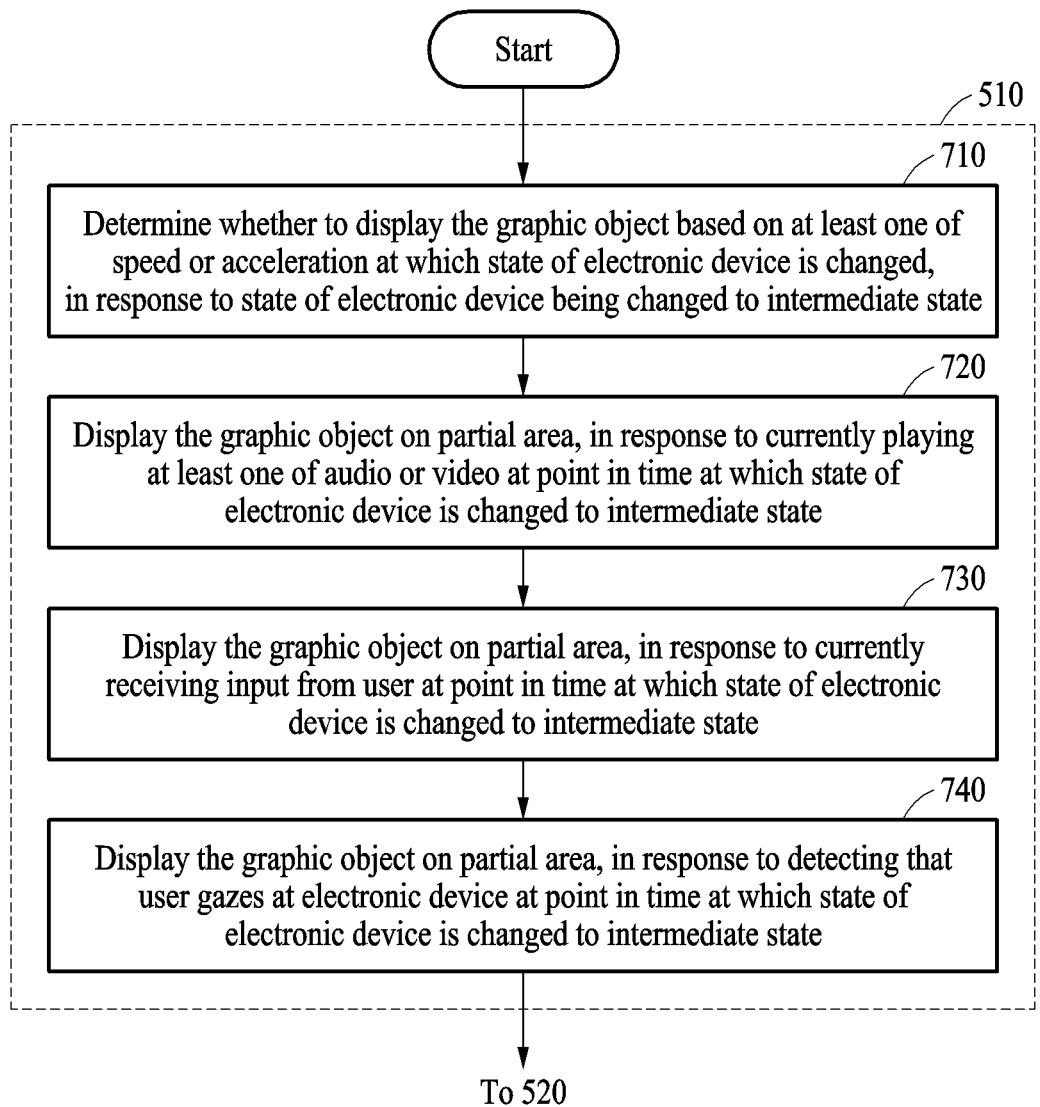
FIG. 7 is a flowchart illustrating an example operation of an electronic device to determine whether to display a graphic object according to various embodiments.

FIG. 7 is a flowchart illustrating an example operation of an electronic device to determine whether to display a graphic object according to various embodiments.

According to an embodiment, an electronic device (e.g., the electronic device 101 of FIG. 1, and the electronic device 200 of FIGS. 2A through 2D) may determine whether to display a graphic object, in response to a state of the electronic device being changed to a partially unfolded intermediate state. For example, in response to the electronic device being in an intermediate state of being folded at a threshold folding angle (e.g., 45 degrees), the electronic device may determine whether to display the graphic object.

In operation 710, the electronic device may determine whether to display the graphic object based on at least one of a speed or an acceleration at which the state of the electronic device is changed.

The speed at which the state of the electronic device is changed may include a speed at which a folding angle (e.g., the folding angle θ of FIGS. 3A to 3D) formed by a first area (e.g., the first area 251 of FIGS. 2A through 2D) and a second area (e.g., the second area 252 of FIGS. 2A through 2D) in the state of the electronic device is changed. The speed at which the state of the electronic device is changed may include an angular velocity (e.g., a variation in a folding angle per unit time) of a folding angle of the electronic device.

According to an embodiment, the electronic device may determine whether to display the graphic object based on a speed at which the state of the electronic device is changed to the intermediate state.

For example, in response to the state of the electronic device being changed to the intermediate state in which the electronic device is folded at the threshold folding angle (e.g., degrees), the electronic device may determine whether to display the graphic object based on an instantaneous angular velocity corresponding to a point in time at which the state of the electronic device is changed to the intermediate state in which the electronic device is folded at the threshold folding angle. The electronic device may compare the above-described instantaneous angular velocity to a threshold angular velocity, to determine whether to display the graphic object. The instantaneous angular velocity may refer to an angular velocity of a folding angle for an extremely short period of time including the point in time at which the state of the electronic device is changed to the intermediate state in which the electronic device is folded at the threshold folding angle.

For example, in response to the state of the electronic device being changed to the intermediate state in which the electronic device is folded at the threshold folding angle (e.g., degrees), the electronic device may determine whether to display the graphic object based on an average angular velocity during a period in which the electronic device is in an intermediate state of being folded at a folding angle within a threshold angle range (e.g., a range of 45 degrees to 90 degrees). The electronic device may compare the above-described average angular velocity to the threshold angular velocity, to determine whether to display the graphic object. The average angular velocity may refer to an angular velocity of a folding angle during the period in which the electronic device is in the intermediate state of being folded at the folding angle within a threshold angle range (e.g., a range of 45 degrees to 90 degrees).

The speed at which the state of the electronic device is changed may be described as an angular velocity of the folding angle herein, however, embodiments are not limited thereto. For example, the speed at which the state of the electronic device is changed may include a speed with respect to a distance between one point (e.g., a point corresponding to a Hall sensor) and another point (e.g., a point corresponding to a magnetic body) of the electronic device.

The acceleration at which the state of the electronic device is changed may include an acceleration at which a folding angle formed by a first area (e.g., the first area 251 of FIGS. 2A through 2D) and a second area (e.g., the second area 252 of FIGS. 2A through 2D) in the state of the electronic device is changed. For example, the acceleration at which the state of the electronic device is changed may include an angular acceleration (e.g., a variation in a folding angular velocity per unit time) of the folding angle of the electronic device.

According to an embodiment, the electronic device may determine whether to display the graphic object based on an acceleration at which the state of the electronic device is changed to the intermediate state.

For example, in response to the state of the electronic device being changed to the intermediate state in which the electronic device is folded at the threshold folding angle (e.g., degrees), the electronic device may determine whether to display the graphic object based on an instantaneous angular acceleration corresponding to a point in time at which the state of the electronic device is changed to the intermediate state in which the electronic device is folded at the threshold folding angle. The electronic device may compare the above-described instantaneous angular acceleration to a threshold angular acceleration, to determine whether to display the graphic object. The instantaneous angular acceleration may refer to an angular acceleration (e.g., a variation in an angular velocity per unit time) for an extremely short period of time including the point in time at which the state of the electronic device is changed to the intermediate state in which the electronic device is folded at the threshold folding angle.

For example, in response to the state of the electronic device being changed to the intermediate state in which the electronic device is folded at the threshold folding angle (e.g., degrees), the electronic device may determine whether to display the graphic object based on an average angular acceleration during a period in which the electronic device is in the intermediate state of being folded at the folding angle within the threshold angle range (e.g., a range of 45 degrees to 90 degrees). The electronic device may compare the above-described average angular acceleration to the threshold angular acceleration, to determine whether to display the graphic object. The average angular acceleration may refer to an angular acceleration (e.g., a variation in an angular velocity per unit time) during the period in which the electronic device is in the intermediate state of being folded at the folding angle within the threshold angle range (e.g., a range of 45 degrees to 90 degrees).

A folding angle formed by a foldable display of the electronic device and calculation of an angular velocity and an angular acceleration for the folding angle will be further described in greater detail below with reference to FIG. 8.

Similarly to the speed, the acceleration at which the state of the electronic device is changed may be described as an angular acceleration of the folding angle herein, however, embodiments are not limited thereto. For example, the acceleration at which the state of the electronic device is changed may include an acceleration with respect to a distance between one point (e.g., a point corresponding to a Hall sensor) and another point (e.g., a point corresponding to a magnetic body) of the electronic device.

In operation 720, the electronic device may determine to display the graphic object, in response to currently playing consecutive content at a point in time at which the state of the electronic device is changed to the intermediate state. For example, the electronic device may determine to display the graphic object on a partial area of a main display, in response to currently playing at least one of audio or video.

According to an embodiment, when consecutive content (e.g., audio, and video) is being played at the point in time at which the state of the electronic device is changed to the intermediate state, the electronic device may perform an operation of switching a screen display of an application to a sub-display by displaying the graphic object. If the graphic object is displayed in a predetermined position, a user may change the state of the electronic device to a folded state. The electronic device may display the screen of the application without interruption by switching the screen display of the application from the main display to the sub-display. The electronic device may play consecutive content without interruption while the state of the electronic device is being changed to the folded state.

In operation 730, the electronic device may determine to display the graphic object, in response to currently receiving an input from a user at the point in time at which the state of the electronic device is changed to the intermediate state. For example, the electronic device may determine to display the graphic object on a partial area of the main display, in response to currently receiving at least one of a voice input or a text input.

For example, the electronic device may be receiving a voice input from a user at the point in time at which the state of the electronic device is changed to the intermediate state. In an example, the electronic device may receive a voice input with an utterance of a user for wired calling with another user through a call application from the user. While the electronic device is receiving the voice input from the user, the state of the electronic device may be changed to the intermediate state in which the electronic device is folded at the threshold folding angle (e.g., 45 degrees).

For example, the electronic device may be receiving a text input from the user at the point in time at which the state of the electronic device is changed to the intermediate state. In an example, the electronic device may receive a text input from the user through an input device (e.g., a keyboard) that communicates with the electronic device by wire and/or wirelessly. While the electronic device is receiving the text input from the user, the state of the electronic device may be changed to the intermediate state in which the electronic device is folded at the threshold folding angle (e.g., 45 degrees).

According to an embodiment, when the electronic device is receiving an input (e.g., a voice input, a text input, etc.) at the point in time at which the state of the electronic device is changed to the intermediate state, the electronic device may perform an operation of switching the screen display of the application from the main display to the sub-display by displaying the graphic object. If the graphic object is displayed in a predetermined position, the user may change the state of the electronic device to the folded state. The electronic device may maintain execution of the application while the state of the electronic device is being changed. The electronic device may receive the input from the user without interruption by maintaining the execution of the application. While the state of the electronic device is being changed to the folded state, the electronic device may receive the input from the user without interruption.

In operation 740, the electronic device may determine to display the graphic object, in response to detecting that a user gazes at the electronic device at the point in time at which the state of the electronic device is changed to the intermediate state. For example, in response to detecting that the user gazes at a predetermined area of the electronic device, the electronic device may determine to display the graphic object. In an example, the predetermined area may include a partial area (e.g., a partial area on which a graphic object is displayed) of the main display. In another example, the predetermined area may include a screen area of the sub-display.

According to an embodiment, when a gaze of the user is detected at the point in time at which the state of the electronic device is changed to the intermediate state, the electronic device may perform the operation of switching the screen display of the application to the sub-display by displaying the graphic object. If the graphic object is displayed in a predetermined position, the user may change the state of the electronic device to the folded state. The electronic device may display the screen of the application without interruption by switching the screen display of the application from the main display to the sub-display. To view the screen of the application even after the electronic device is changed to the folded state, the user may gaze at a predetermined area when the electronic device is in the intermediate state.

Figure 8:
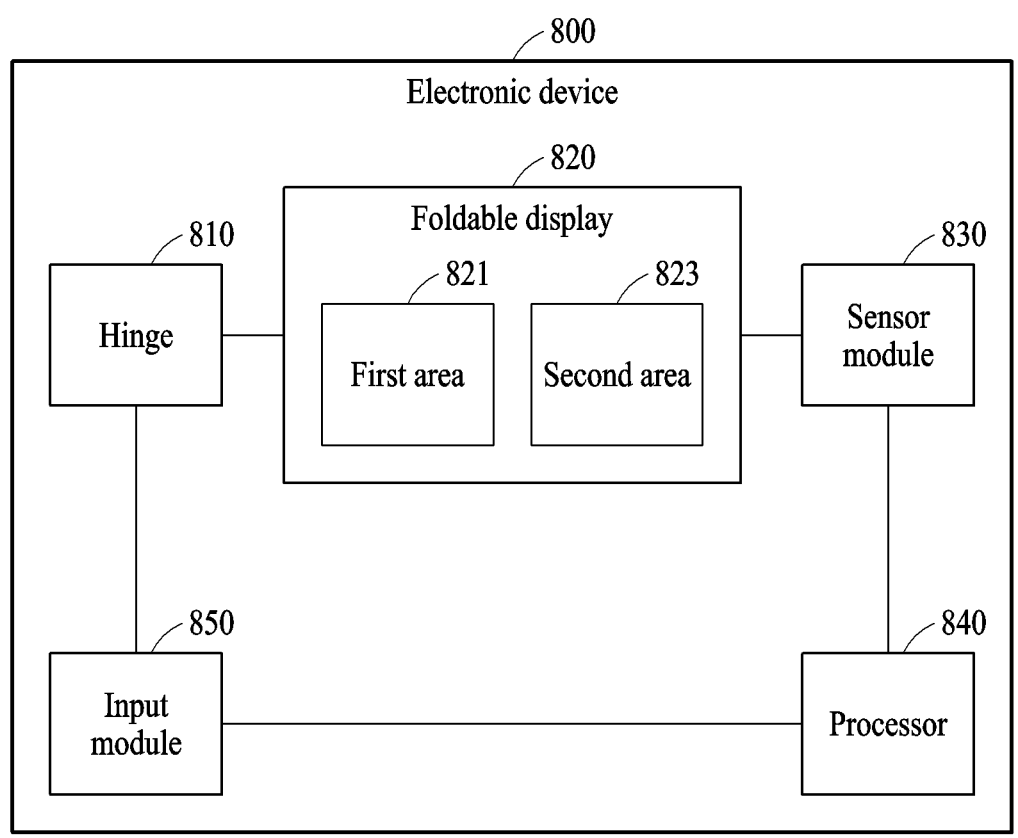
FIG. 8 is a block diagram illustrating an example configuration of an electronic device according to various embodiments.

FIG. 8 is a block diagram illustrating an example configuration of an electronic device according to various embodiments.

An electronic device 800 (e.g., the electronic device 101 of FIG. 1, and the electronic device 200 of FIGS. 2A through 2D) according to an embodiment may include a hinge 810 configured to allow the electronic device 800 to be folded or unfolded, a foldable display 820 (e.g., the display 250 of FIGS. 2A through 2D) disposed on at least one side of the electronic device 800 such that the electronic device 800 may be folded or unfolded around the hinge 810, a sensor module (e.g., including at least one sensor) 830 configured to sense a state (e.g., an unfolded state, a partially unfolded intermediate state, a folded state, etc.) of the electronic device 800, a processor (e.g., including processing circuitry) 840 configured to control a screen to be displayed through the foldable display 820 based on the state of the electronic device 800, and input module (e.g. input module 150 of FIG. 1) 850.

The processor 840 may include various processing circuitry and determine the state of the electronic device 800 to be one of an unfolded state corresponding to a state in which the foldable display 820 is unfolded, a partially unfolded intermediate state in which the foldable display 820 forms a folding angle within a predefined folding angle range, and a folded state corresponding to a state in which the foldable display 820 is folded.

According to an embodiment, the hinge 810 may allow the electronic device 800 to be folded or unfolded. As the electronic device 800 is folded or unfolded around the hinge 810, the foldable display 820 may also be folded or unfolded. The foldable display 820 may be disposed on at least one side of the electronic device 800 and may include a first area 821 (e.g., the first area 251 of FIGS. 2A through 2D) disposed on one side of the hinge 810 and a second area 823 (e.g., the second area 252 of FIGS. 2A through 2D) disposed on the other side of the hinge 810.

According to an embodiment, the sensor module 830 (e.g., the sensor module 176 of FIG. 1) may include at least one sensor and detect a folding angle (e.g., the folding angle θ of FIGS. 3A to 3D) of the electronic device 800. The sensor module 830 according to an embodiment may be a Hall sensor, an acceleration sensor, and/or a gyro sensor (e.g., a gyroscope), and the acceleration sensor and/or the gyro sensor may detect the folding angle of the electronic device 800. The sensor module 830 according to an embodiment may be disposed inside the hinge 810 to detect the folding angle by detecting the number of rotations of a gear.

The sensor module 830 according to an embodiment may detect a point in time at which folding is started and an angle at which folding stops, in addition to the folding angle.

In an example, the sensor module 830 may be a Hall sensor. The Hall sensor may be a transducer for generating an electrical signal (e.g., a voltage) in response to a magnetic field. The Hall sensor may generate an electrical signal with a relatively high intensity when the magnetic field has a high intensity, and may generate an electrical signal with a relatively low intensity when the magnetic field has a low intensity. The Hall sensor may be positioned in a first housing structure (e.g., the first housing structure 210 of FIGS. 2A through 2D), and an element (e.g., a magnetic body) for generating a magnetic field may be positioned in a second housing structure (e.g., the second housing structure 220 of FIGS. 2A through 2D). Depending on implementation, the Hall sensor may be positioned in the second housing structure, and a magnetic body may be positioned in the first housing structure. If the state of the electronic device 800 is changed from a fully unfolded state to the folded state, the Hall sensor may approach the magnetic body and detect the folded state of the foldable display 820 in response to a magnetic field of the magnetic body. In addition, the Hall sensor may detect the folding angle via an intensity of an electrical signal generated in response to the magnetic field.

The Hall sensor is an example of the sensor module 830, and the sensor module 830 is not limited to the Hall sensor. According to an embodiment, a magnetic (geomagnetic) sensor and a Hall sensor may be used to detect the folding angle of the electronic device 800. For example, the magnetic (geomagnetic) sensor and the Hall sensor may include a transmitter to generate a magnetic field of a predetermined frequency and a receiver to receive the magnetic field generated by the transmitter, and may detect the folding angle based on a change in the state of the electronic device 800. For example, the magnetic (geomagnetic) sensor may measure an orientation using a magnetic field and magnetic force lines, and the Hall sensor may identify the change in the state of the electronic device 800 by detecting the strength of the magnetic field and may detect the folding angle (e.g., the folding angle θ of FIGS. 3A to 3D).

Although the sensor module 830 senses the folded state of the foldable display 820 and detects the folding angle as described above, the processor 840 according to an embodiment may detect the folded state of the foldable display 820 based on a sensing result of the sensor module 830 and calculate the folding angle. For example, the processor 840 may receive an electrical signal according to a detection of the magnetic field from the Hall sensor. The processor 840 may detect the folded state of the foldable display 820 by receiving the electrical signal from the Hall sensor. In addition, the processor 840 may calculate the folding angle of the foldable display 820 based on the intensity of the electrical signal received from the Hall sensor.

The processor 840 may calculate at least one of a speed or an acceleration at which the state of the electronic device 800 is changed, based on the folding angle.

For example, in response to the state of the electronic device 800 being changed to an intermediate state in which the electronic device 800 is folded at a threshold folding angle (e.g., degrees), the processor 840 may calculate an instantaneous angular velocity of the folding angle. For example, in response to the state of the electronic device 800 being changed to the intermediate state in which the electronic device 800 is folded at the threshold folding angle (e.g., 45 degrees), the processor 840 may calculate an average angular velocity of the folding angle during a period in which the electronic device 800 is in an intermediate state of being folded at a folding angle within a threshold angle range (e.g., a range of 45 degrees to 90 degrees) of the electronic device 800.

For example, in response to the state of the electronic device 800 being changed to the intermediate state in which the electronic device 800 is folded at the threshold folding angle (e.g., 45 degrees), the processor 840 may calculate an instantaneous angular acceleration of the folding angle. For example, in response to the state of the electronic device 800 being changed to the intermediate state in which the electronic device 800 is folded at the threshold folding angle (e.g., 45 degrees), the processor 840 may calculate an average angular acceleration of the folding angle during the period in which the electronic device 800 is in the intermediate state of being folded at the folding angle within the threshold angle range (e.g., a range of 45 degrees to 90 degrees).

Figure 9:
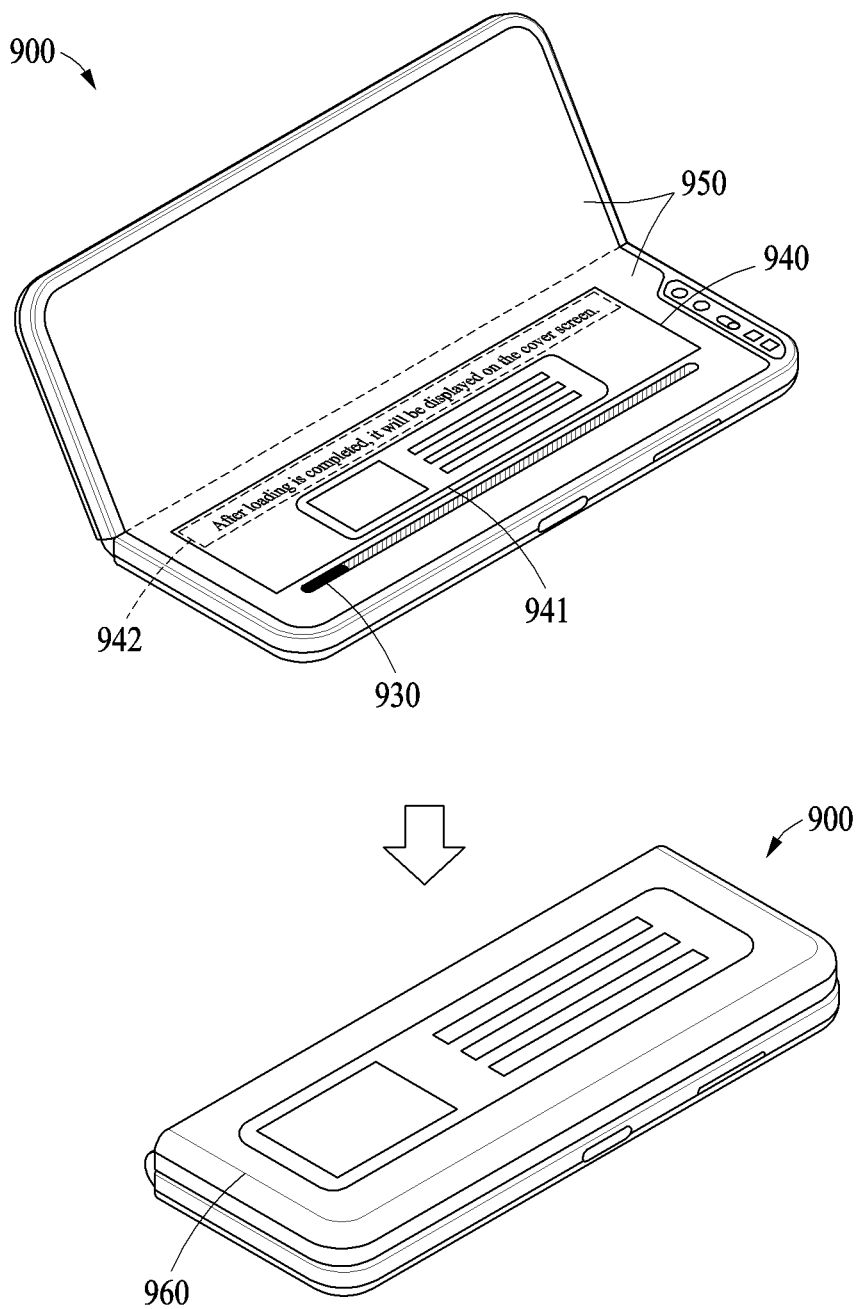
FIG. 9 is a diagram illustrating an example operation of an electronic device to display a preview screen of an application together with a graphic object according to various embodiments.

FIG. 9 is a diagram illustrating an example operation of an electronic device to display a preview screen of an application together with a graphic object according to various embodiments.

According to an embodiment, as described above, an electronic device 900 (e.g., the electronic device 101 of FIG. 1, and the electronic device 200 of FIGS. 2A through 2D) may be executing an application. The electronic device 900 may display a graphic object 930 on a partial area of a main display 950 in response to a state of the electronic device 900 being changed to a partially unfolded intermediate state.

According to an embodiment, the electronic device 900 may display a preview screen 940 of the application on another partial area of the main display 950 in response to displaying the graphic object 930. The other partial area may be partial area of the main display 950 other than an area on which the graphic object 930 is displayed. The preview screen 940 of the application may include a screen based on a screen that is to be displayed as a screen of the application on a sub-display 960 when the electronic device 900 is in a folded state. For example, the preview screen 940 may include a screen 941 to be displayed on the sub-display 960. For example, the preview screen 940 may further include a guide message 942 together with the screen 941 to be displayed on the sub-display 960. The guide message 942 may include a message associated with displaying the screen of the application on the sub-display 960 when the graphic object 930 is displayed in a predetermined position before the state of the electronic device 900 is changed to the folded state.

According to an embodiment, the electronic device 900 may display the screen of the application on the sub-display 960 in response to displaying the graphic object 930 in a predetermined position on the partial area before the state of the electronic device 900 is changed to the folded state. The electronic device 900 may display the screen of the application on the sub-display 960 in response to the state of the electronic device 900 being the folded state.

According to an embodiment, the main display 950 and the sub-display 960 may be different from each other in aspect ratio and/or screen size. Even when the electronic device 900 executes the same application, the screen of the application displayed when the main display 950 is activated may be different from the screen of the application displayed when the sub-display 960 is activated. If the state of the electronic device 900 is changed from a partially unfolded state (or an unfolded state) to the folded state, the electronic device 900 may switch a screen display of the application from the main display 950 to the sub-display 960. When the screen displayed on the main display 950 is different from the screen to be displayed on the sub-display 960, the electronic device 900 may display the preview screen 940 on the main display 950 to provide a user with information on the screen to be displayed on the sub-display 960. The electronic device 900 according to an embodiment may provide the user with an interface capable of predicting a screen to be displayed even though the screen display of the application is switched.

Figure 10:
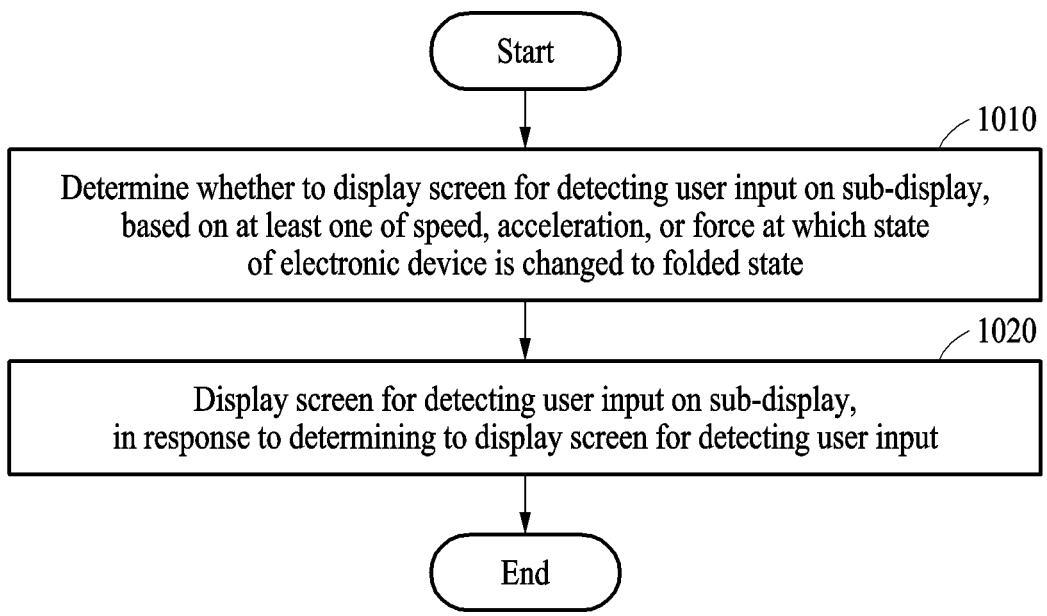
FIG. 10 is a flowchart illustrating an example operation of an electronic device to display a screen for detecting a user input on a sub-display according to various embodiments.

FIG. 10 is a flowchart illustrating an example operation of an electronic device to display a screen for detecting a user input on a sub-display according to various embodiments.

In operation 1010, the electronic device may determine whether to display a screen for detecting a user input on a sub-display. For example, the electronic device may determine whether to display the screen for detecting the user input based on at least one of a speed, an acceleration, or a force at which a state of the electronic device is changed to a folded state.

According to an embodiment, the electronic device may determine whether to display the screen for detecting the user input based on the speed at which the state of the electronic device is changed to the folded state. For example, in response to the state of the electronic device being changed to the folded state, the electronic device may determine whether to display the screen for detecting the user input based on an instantaneous angular velocity corresponding to a point in time at which the state of the electronic device is changed to the folded state. For example, in response to the state of the electronic device being changed to the folded state, the electronic device may determine whether to display the screen for detecting the user input based on an average angular velocity during a period in which the electronic device is in an intermediate state of being folded at a folding angle in a threshold angle range (e.g., a range of 5 degrees to 30 degrees). In an example, when the speed (e.g., an instantaneous angular velocity, and an average angular velocity) at which the state of the electronic device is changed to the folded state is greater than or equal to a threshold (e.g., a threshold angular velocity), the electronic device may determine to display the screen for detecting the user input.

According to an embodiment, the electronic device may determine whether to display the screen for detecting the user input based on an acceleration at which the state of the electronic device is changed to the folded state. For example, in response to the state of the electronic device being changed to the folded state, the electronic device may determine whether to display the screen for detecting the user input based on an instantaneous angular acceleration corresponding to the point in time at which the state of the electronic device is changed to the folded state. For example, in response to the state of the electronic device being changed to the folded state, the electronic device may determine whether to display the screen for detecting the user input based on an average angular acceleration during the period in which the electronic device is in the intermediate state of being folded at the folding angle in the threshold angle range (e.g., a range of 5 degrees to 30 degrees). In an example, when the acceleration (e.g., an instantaneous angular acceleration, and an average angular acceleration) at which the state of the electronic device is changed to the folded state is greater than or equal to a threshold (e.g., a threshold angular acceleration), the electronic device may determine to display the screen for detecting the user input.

According to an embodiment, the electronic device may determine whether to display the screen for detecting the user input based on the force at which the state of the electronic device is changed to the folded state. The force at which the state of the electronic device is changed to the folded state may include a force applied to a component (e.g., a first housing structure, and a second housing structure) of the electronic device when the state of the electronic device is changed to the folded state. For example, when the force at which the state of the electronic device is changed to the folded state is greater than or equal to a threshold force, the electronic device may determine whether to display the screen for detecting the user input.

In operation 1020, the electronic device may display the screen for detecting the user input on the sub-display, in response to determining to display the screen for detecting the user input.

The screen for detecting the user input may refer to a screen for detecting a user input associated with whether the electronic device is to perform an operation.

According to an embodiment, the screen for detecting the user input may include a first screen for detecting an input to stop execution of an application. In response to detecting a user input (e.g., a touch input) in an area of the first screen corresponding to stop of the execution of the application, the electronic device may stop the execution of the application. In response to detecting a user input (e.g., a touch input) in an area of the first screen corresponding to maintenance of the execution of the application, the electronic device may maintain the execution of the application. When the execution of the application is maintained, the electronic device may display the screen of the application on the sub-display.

When the state of the electronic device is changed to the folded state, the electronic device may select whether to stop the execution of the application or maintain the execution of the application according to a user input by displaying the first screen instead of unconditionally stopping the execution of the application. For example, if the user accidentally drops the electronic device, the user may want to maintain the execution of the application instead of stopping the execution of the application even though the state of the electronic device is changed to the folded state. The electronic device according to an embodiment may display a screen for detecting a user input associated with stopping the execution of the application when the user drops the electronic device. The electronic device may determine whether to stop the execution of the application according to the user input.

According to an embodiment, the screen for detecting the user input may include a second screen for detecting an input to perform an operation mapped to the application. The operation mapped to the application may include a predetermined operation as an operation that may be performed when a state of an electronic device that is executing a corresponding application is changed to the folded state. The second screen may include an area corresponding to the performing of the operation mapped to the application. The second screen may include an area corresponding to skipping of the performing of the operation mapped to the application. The second screen may have a message used to transfer the operation mapped to the application to a user. In response to detecting a user input (e.g., a touch input) in an area of the second screen corresponding to the performing of the operation mapped to the application, the electronic device may perform the operation mapped to the application. In response to detecting a user input (e.g., a touch input) in an area of the second screen corresponding to skipping of the performing of the operation mapped to the application, the electronic device may skip the performing of the operation mapped to the application.

For example, the electronic device may be executing a call application. An operation mapped to the call application may be an operation of blocking contact information. When the state of the electronic device is changed to the folded state at a speed greater than or equal to a threshold, the electronic device may determine to display a screen for detecting an input to perform the operation of blocking contact information. In an example, the electronic device may display a contact information input screen for detecting an input associated with the contact information among screens of the call application on the main display. While the electronic device is displaying the contact information input screen, the state of the electronic device may be changed to the folded state. The operation of blocking the contact information may include an operation of blocking contact information input before the state of the electronic device is changed to the folded state. In an example, the electronic device may perform a call between a user and another user through the call application. The operation of blocking the contact information may include an operation of blocking contact information of the other user who is on a call with the user.

According to an example embodiment, an electronic device may include a display module including a main display and a sub-display. The electronic device may include a memory configured to store computer-executable instructions. The electronic device may include a processor configured to execute the instructions by accessing the memory. The instructions, when executed, may cause the processor to, in response to a state of the electronic device that is executing an application being changed to a partially unfolded intermediate state, display a graphic object associated with switching a screen display of the application from the main display to the sub-display on a partial area of the main display. The instructions, when executed, may cause the processor to, in response to the graphic object being displayed in a specified position on the partial area before the state of the electronic device is changed to a folded state, display a screen of the application on the sub-display.

The instructions, when executed, may cause the processor to, in response to the state of the electronic device being changed to the partially unfolded intermediate state, determine whether to display the graphic object based on at least one of a speed or an acceleration at which the state of the electronic device is changed.

The instructions, when executed, may cause the processor to, in response to the electronic device currently playing at least one of audio or video at a point in time at which the state of the electronic device is changed to the partially unfolded intermediate state, display the graphic object on the partial area.

The instructions, when executed, may cause the processor to, in response to the electronic device currently receiving an input from a user at a point in time at which the state of the electronic device is changed to the partially unfolded intermediate state, display the graphic object on the partial area.

The instructions, when executed, may cause the processor to, in response to detecting that a user gazes at the electronic device at a point in time at which the state of the electronic device is changed to the partially unfolded intermediate state, display the graphic object on the partial area.

The instructions, when executed, may cause the processor to, in response to displaying the graphic object on the partial area, display a preview screen of the application on another partial area of the main display.

The instructions, when executed, may cause the processor to determine whether to display a screen for detecting an input to stop execution of the application on the sub-display, based on at least one of a speed, an acceleration, or a force at which the state of the electronic device is changed to the folded state.

The instructions, when executed, may cause the processor to determine whether to display a screen for detecting an input to perform an operation mapped to the application on the sub-display, based on at least one of a speed, an acceleration, or a force at which the state of the electronic device is changed to the folded state.

The instructions, when executed, may cause the processor to, in response to the electronic device being in the folded state, stop the displaying of the graphic object on the partial area.

The instructions, when executed, may cause the processor to, in response to the partially unfolded intermediate state of the electronic device being maintained for a threshold length of time, display the graphic object in the specified position.

According to an example embodiment, a method performed by an electronic device may include, in response to a state of the electronic device that is executing an application being changed to a partially unfolded intermediate state, displaying a graphic object associated with switching a screen display of the application from a main display of a display module to a sub-display of the display module on a partial area of the main display. The method performed by the electronic device may include, in response to the graphic object being displayed in a specified position on the partial area before the state of the electronic device is changed to a folded state, displaying a screen of the application on the sub-display.

The displaying of the graphic object on the partial area of the main display may include, in response to the state of the electronic device being changed to the partially unfolded intermediate state, determining whether to display the graphic object based on at least one of a speed or an acceleration at which the state of the electronic device is changed.

The displaying of the graphic object on the partial area of the main display may include, in response to the electronic device currently playing at least one of audio or video at a point in time at which the state of the electronic device is changed to the partially unfolded intermediate state, displaying the graphic object on the partial area.

The displaying of the graphic object on the partial area of the main display may include, in response to the electronic device currently receiving an input from a user at a point in time at which the state of the electronic device is changed to the partially unfolded intermediate state, displaying the graphic object on the partial area.

The displaying of the graphic object on the partial area of the main display may include, in response to detecting that a user gazes at the electronic device at a point in time at which the state of the electronic device is changed to the partially unfolded intermediate state, displaying the graphic object on the partial area.

The method performed by the electronic device may include, in response to displaying the graphic object on the partial area, displaying a preview screen of the application on another partial area of the main display.

The method performed by the electronic device may include determining whether to display a screen for detecting an input to stop execution of the application on the sub-display, based on at least one of a speed, an acceleration, or a force at which the state of the electronic device is changed to the folded state.

The method performed by the electronic device may include determining whether to display a screen for detecting an input to perform an operation mapped to the application on the sub-display, based on at least one of a speed, an acceleration, or a force at which the state of the electronic device is changed to the folded state.

The method performed by the electronic device may include, in response to the electronic device being in the folded state, stopping the displaying of the graphic object on the partial area.

The method performed by the electronic device may include, in response to the partially unfolded intermediate state of the electronic device being maintained for a threshold length of time, displaying the graphic object in the specified position.

The electronic device according to the embodiments disclosed herein may be one of various types of electronic devices. The electronic device may include, for example, a portable communication device (e.g., a smartphone), a computer device, a portable multimedia device, a portable medical device, a camera, a wearable device, a home appliance device, or the like. According to an embodiment of the disclosure, the electronic device is not limited to those described above.

It should be understood that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "$1^{st}$", "$2^{nd}$" or "first" or "second" may simply be used to distinguish the component from other components in question, and do not limit the components in other aspects (e.g., importance or order). It is to be understood that if a component (e.g., a first component) is referred to, with or without the term "operatively" or "communicatively", as "coupled with", "coupled to", "connected with", or "connected to" another component (e.g., a second component), the component may be coupled with the other component directly (e.g., by wire), wirelessly, or via a third component.

As used in connection with embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an example embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:
1. An electronic device comprising:
   a display module comprising a main display and a sub-display, wherein the main display is foldable and includes a first area and a second area, the first area and the second area configured to face a same direction in an unfolded state, the first area and the second area configured to face each other in a folded state, and the sub-display is configured to face a direction that is opposite to the first area and/or the second area in the folded state and in the unfolded state;

at least one processor comprising processing circuitry; and memory storing instructions that, when executed, by the at least one processor individually or collectively, cause the electronic device to:

detect a state of the electronic device being in a partially unfolded intermediate state during display of a first screen of an application on the main display, detect the state of the electronic device being maintained as the partially unfolded intermediate state for a threshold length of time, in response to the state of the electronic device being the partially unfolded intermediate state during displaying the first screen of an application on the main display, display, in a first position of the main display, a graphic object associated with switching a screen display of the application from the main display to the sub-display, in response to the state of the electronic device being maintained as the partially unfolded intermediate state for the threshold length of time, display the graphic object in a second position of the main display, and in response to the state of the electronic device being changed from the partially unfolded intermediate state to the folded state after the state of the electronic device being maintained in the partially unfolded intermediate state for the threshold length of time, display a second screen of the application on the sub-display, wherein the partially unfolded intermediate state is state in which the electronic device is folded at a folding angle falling within a threshold angle range.

2. The electronic device of claim 1, wherein the instructions, when executed by at least one processor is individually and/or collectively cause the electronic device to, in response to the state of the electronic device being changed to the partially unfolded intermediate state, determine whether to display the graphic object based on at least one of a speed or an acceleration at which the state of the electronic device is changed.

3. The electronic device of claim 1, wherein the instructions, when executed by at least one processor is individually and/or collectively, cause the electronic device to, in response to the electronic device currently playing at least one of an audio or a video at a point in time at which the state of the electronic device is changed to the partially unfolded intermediate state, display the graphic object on a partial area of the main display.

4. The electronic device of claim 1, wherein the instructions, when executed by at least one processor is individually and/or collectively, cause the electronic device to, in response to the electronic device currently receiving an input at a point in time at which the state of the electronic device is changed to the partially unfolded intermediate state, display the graphic object on a partial area of the main display.

5. The electronic device of claim 1, wherein the instructions, when executed by at least one processor is individually and/or collectively, cause the electronic device to, in response to detecting that a user gazes at the electronic device at a point in time at which the state of the electronic device is changed to the partially unfolded intermediate state, display the graphic object on a partial area of the main display.

6. The electronic device of claim 1, wherein the instructions, when executed by at least one processor is individually and/or collectively, cause the electronic device to, in response to displaying the graphic object on a partial area of the main display, display a preview screen of the application on another partial area of the main display.

7. The electronic device of claim 1, wherein the instructions, when executed by at least one processor is individually and/or collectively, cause the electronic device to determine whether to display a screen for detecting an input to stop execution of the application on the sub-display, based on at least one of a speed, an acceleration, or a force at which the state of the electronic device is changed to the folded state.

8. The electronic device of claim 1, wherein the instructions, when executed by at least one processor is individually and/or collectively, cause the electronic device to determine whether to display a screen for detecting an input to perform an operation mapped to the application on the sub-display, based on at least one of a speed, an acceleration, or a force at which the state of the electronic device is changed to the folded state.

9. The electronic device of claim 2, wherein the instructions, when executed by at least one processor is individually and/or collectively, cause the electronic device to, in response to the electronic device being in the folded state, stop the displaying of the graphic object on a partial area of the main display.

10. The electronic device of claim 1, wherein the instructions, when executed by at least one processor is individually and/or collectively, cause the electronic device to, in response to the partially unfolded intermediate state of the electronic device being maintained for the threshold length of time, display the graphic object on the main display.

11. A method performed by an electronic device including a display module comprising a main display and a sub-display, wherein the main display is foldable and includes a first area and a second area, the first area and the second area face a same direction in an unfolded state, the first area and the second area face each other in a folded state, and the sub-display faces a direction that is opposite to the first area and/or the second area in the folded state and in the unfolded state, the method comprising:

detecting a state of the electronic device being in a partially unfolded intermediate state during display of a first screen of an application on the main display;

detecting the state of the electronic device being maintained as the partially unfolded intermediate state for a threshold length of time;

in response to the state of the electronic device being the partially unfolded intermediate state during displaying the first screen of the application on the main display, displaying, in a first position of the main display, a graphic object associated with switching a screen display of the application from the main display to the sub-display;

in response to the state of the electronic device being maintained as the partially unfolded intermediate state for the threshold length of time, displaying the graphic object in a second position of the main display; and in response to the state of the electronic device being changed from the partially unfolded intermediate state to the folded state after the state of the electronic device being maintained in the partially unfolded intermediate state for the threshold length of time, displaying a second screen of the application on the sub-display,
wherein the partially unfolded intermediate state is state in which the electronic device is folded at a folding angle falling within a threshold angle range.

12. The method of claim 11, further comprising: in response to the state of the electronic device being changed to the partially unfolded intermediate state, determining whether to display the graphic object based on at least one of a speed or an acceleration at which the state of the electronic device is changed.

13. The method of claim 11, further comprising: in response to the electronic device currently playing at least one of an audio or a video at a point in time at which the state of the electronic device is changed to the partially unfolded intermediate state, displaying the graphic object on a partial area of the main display.

14. The method of claim 11, further comprising: in response to the electronic device currently receiving an input at a point in time at which the state of the electronic device is changed to the partially unfolded intermediate state, displaying the graphic object on a partial area of the main display.

15. The method of claim 11, further comprising: in response to detecting that a user gazes at the electronic device at a point in time at which the state of the electronic device is changed to the partially unfolded intermediate state, displaying the graphic object on a partial area of the main display.

16. The method of claim 11, further comprising:
in response to displaying the graphic object on a partial area of the main display, displaying a preview screen of the application on another partial area of the main display.

17. The method of claim 11, further comprising:
in response to the electronic device being in the folded state, stopping the displaying of the graphic object on the main display.

18. The method of claim 11, further comprising:
in response to the partially unfolded intermediate state of the electronic device being maintained for the threshold length of time, displaying the graphic object on the main display.

* * * * *